United States Patent
Kawamura et al.

(10) Patent No.: US 10,061,710 B2
(45) Date of Patent: Aug. 28, 2018

(54) STORAGE DEVICE

(71) Applicant: HITACHI, LTD., Tokyo (JP)

(72) Inventors: Atsushi Kawamura, Tokyo (JP); Junji Ogawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/110,581

(22) PCT Filed: Jan. 29, 2014

(86) PCT No.: PCT/JP2014/051949
§ 371 (c)(1),
(2) Date: Jul. 8, 2016

(87) PCT Pub. No.: WO2015/114754
PCT Pub. Date: Aug. 6, 2015

(65) Prior Publication Data
US 2016/0335195 A1    Nov. 17, 2016

(51) Int. Cl.
| | | |
|---|---|---|
| *G06F 12/10* | (2016.01) | |
| *G06F 12/1009* | (2016.01) | |
| *G06F 3/06* | (2006.01) | |
| *G06F 12/02* | (2006.01) | |

(52) U.S. Cl.
CPC ......... *G06F 12/1009* (2013.01); *G06F 3/061* (2013.01); *G06F 3/064* (2013.01); *G06F 3/0616* (2013.01); *G06F 3/0644* (2013.01); *G06F 3/0656* (2013.01); *G06F 3/0679* (2013.01); *G06F 3/0688* (2013.01); *G06F 12/0246* (2013.01); *G06F 2212/657* (2013.01); *G06F 2212/7201* (2013.01)

(58) Field of Classification Search
CPC .................................................. G06F 12/0246
See application file for complete search history.

(56) References Cited

U.S. PATENT DOCUMENTS

| | | | | |
|---|---|---|---|---|
| 5,623,654 | A | * | 4/1997 | Peterman ............. G06F 12/023 |
| 7,529,905 | B2 | | 5/2009 | Sinclair |
| 2005/0144357 | A1 | | 6/2005 | Sinclair |

(Continued)

FOREIGN PATENT DOCUMENTS

| | | |
|---|---|---|
| JP | 2012-099139 A | 5/2012 |
| JP | 2012-113699 A | 6/2012 |
| JP | 2012-173778 A | 9/2012 |

*Primary Examiner* — Edward J Dudek, Jr.
(74) *Attorney, Agent, or Firm* — Volpe and Koenig, P.C.

(57) ABSTRACT

The present invention provides a storage device adopting a semiconductor device as a storage media having a nonvolatile property and must be erased for writing data, wherein the device divides and manages a logical storage space provided to a higher level device in logical page units, and manages a virtual address space which is a linear address space to which multiple physical blocks of the semiconductor device are mapped. The storage device uses a page mapping table managing a correspondence between a logical page and an address in the virtual address space, and a virtual address configuration information managing a correspondence between an area in the virtual address space and a physical block, in order to manage the correspondence between the respective logical pages and storage areas of the semiconductor device.

14 Claims, 24 Drawing Sheets

(56) References Cited

U.S. PATENT DOCUMENTS

| | | | |
|---|---|---|---|
| 2007/0086260 A1* | 4/2007 | Sinclair | G06F 12/0246 365/230.03 |
| 2011/0029715 A1* | 2/2011 | Hu | G06F 12/0246 711/103 |
| 2012/0137050 A1 | 5/2012 | Wang et al. | |
| 2012/0215964 A1 | 8/2012 | Kaneko et al. | |
| 2014/0181376 A1* | 6/2014 | Miyamoto | G06F 12/0246 711/103 |
| 2014/0215133 A1* | 7/2014 | Seo | G06F 12/0246 711/103 |

\* cited by examiner

| Logical-Physical Conversion Table ||
| 702 | 703 |
| Logical Page | Storage Address |
| 0 | 0x00A |
| 1 | 0x00B |
| ... ||

Fig.11

Page Mapping Table

| Logical Page | Group # | Offset Address |
|---|---|---|
| 0 | 0 | 0 |
| 1 | 1 | 10 |
| ... | | |

Fig. 12

| Group | Subsequent Write Position | Virtual Block # | Physical Block # | Number of Invalid Pages | Final Write Time |
|---|---|---|---|---|---|
| 0 | 10 | 0 | 0x00A | 0 | 0:00 |
| | | 1 | 0x00B | | |
| | | | | | |
| | | N-1 | 0x00F | | |
| 1 | N/A | 0 | 0x10A | 22 | ... |
| | | 1 | 0x10B | | |
| | | | | | |
| | | N-1 | 0x10F | | |
| ..... | | | | | |

Virtual Address Configuration Information
1007

Page Mapping Table

| Logical Page | Group # | Offset Address | Length |
|---|---|---|---|
| 0 | 0 | 0 | 16 |
| 1 | 1 | 10 | 10 |
| ... | | | |

Fig.22

| Group | Subsequent Write Position | Virtual Block # | Physical Block # | Number of Invalid Pages | Final Write Time | Type |
|---|---|---|---|---|---|---|
| 0 | 10 | 0 | 0x00A | 0 | 0:00 | Type A |
| | | 1 | 0x00B | | | |
| | | | | | | |
| | | N-1 | 0x00F | | | |
| 1 | N/A | 0 | 0x10A | 22 | ... | Type B |
| | | 1 | 0x10B | | | |
| | | | | | | |
| | | N-1 | 0x10F | | | |
| ..... | | | | | | |

Virtual Address Configuration Information
2201

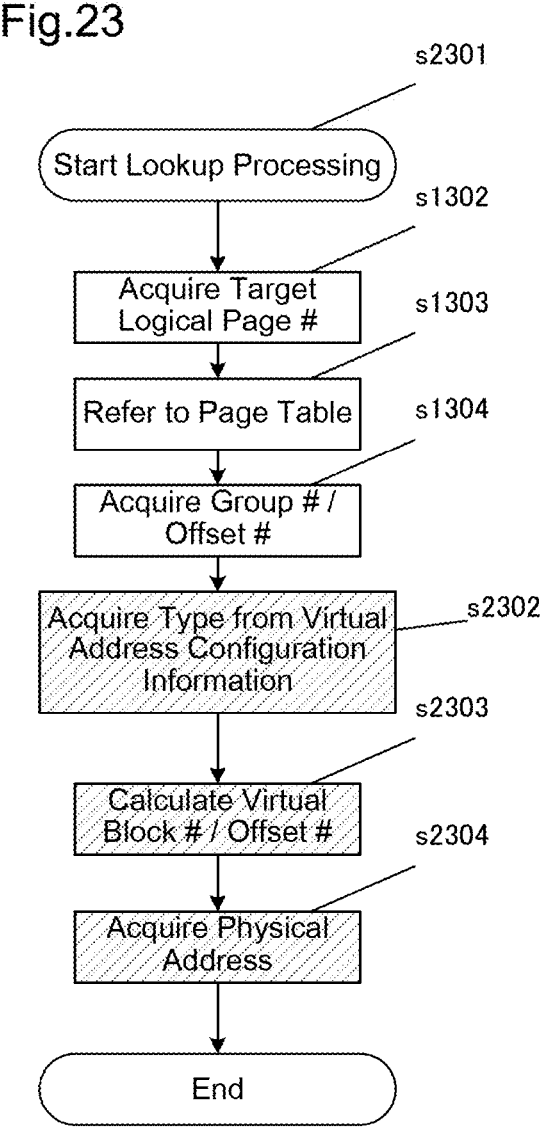

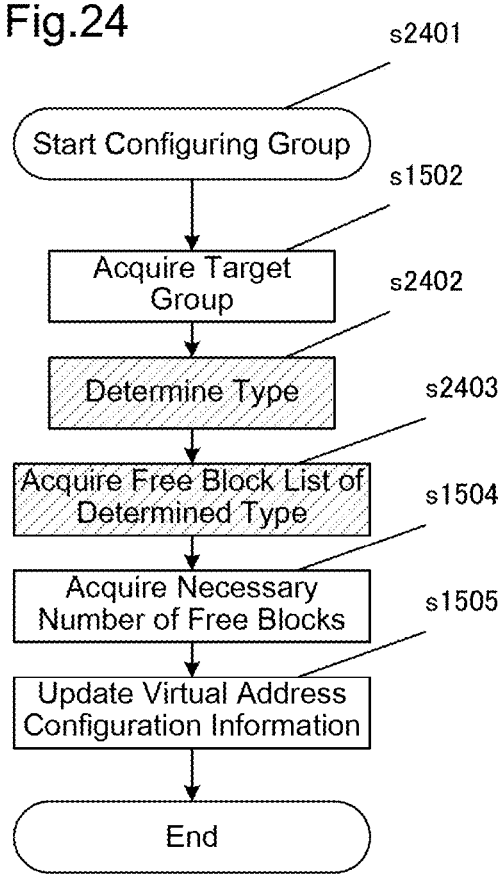

STORAGE DEVICE

TECHNICAL FIELD

The present invention relates to a storage device using a nonvolatile semiconductor memory, and a method for controlling the same.

BACKGROUND ART

Nonvolatile semiconductor memories are power efficient, have high performance and are more expensive compared to magnetic storage devices. One example of such nonvolatile semiconductor memory is a NAND-type flash memory. Recently, the costs of such memories are reduced along with the advancement of semiconductor technology, and these memories are attracting attention as mainstream storage devices which may be used instead of HDDs.

In a flash memory, a block is a unit for erasing data, and a page is a storage area of a data read/write unit. In the following, unless otherwise stated, a block and a page refer to those of a flash memory. As described later, multiple pages are provided within a single block. Further, from characteristic reasons, the flash memory cannot directly rewrite the data stored therein. In other words, in order to rewrite the stored data, the flash memory must save the stored valid data in another block. Thereafter, the flash memory erases the stored data in block units. Then, the flash memory writes data in the erased block. As described, the rewriting of data in the flash memory accompanies erasing of data in block units. However, the time required to erase data corresponding to a single block of the flash memory is greater by a degree of magnitude than the time required to write data corresponding to a single page. Therefore, if data corresponding to a single block must be erased each time data corresponding to a single page is rewritten, the data rewrite ability of the flash memory will be deteriorated. In order to cope with such problem, a known method adopts an algorithm for concealing the time for erasing the data from the flash memory to write data into the flash memory.

Normally, the operation for rewriting data in the flash memory adopts a method for adding data to an unused area. However, when the amount of rewrite of data is increased, the amount of unused area within the flash memory will be reduced, so that it becomes necessary to erase unnecessary data written in the flash memory to restore the storage areas to a reusable state. Therefore, a block regeneration processing is known where only the valid data within a block including old data is copied to an unused area, and the copy source block is erased to restore the reusable state. Hereafter, this processing is called reclamation. Sometimes, it is abbreviated as RC. Reclamation should be executed to blocks having much invalid data so as to create free spaces efficiently.

The properties of the flash memory deteriorate through use. Deterioration is considered to be correlated with the number of times of erases performed to a cell, and generally, an SSD vendor indicates a maximum number of erases capable of ensuring data retention. Therefore, when rewriting of data concentrates to a certain block and the number of erases increases, causing the block to be unusable, in the worst case, the capacity of the device will not be satisfied since a portion of the blocks have reached the rewrite limit, even though the other areas are good. Therefore, a technique is known to level the number of erases of the respective blocks so that deterioration is not concentrated to a specific block.

Further, in a flash memory, the rate of read error of a once-read page increases with time. The error that occurs merely by retaining data is called a retention error. In order to prevent such error, a process is known to copy a page in which a certain time has elapsed after being written to a different page. This process is called refreshing. In some cases, the process is abbreviated as RF. The refreshing process must also consider the problem of leveling and the influence of performance.

In order to conceal the data erase time and to level the number of times of data erases as mentioned above, the flash storage performs a logical-physical address conversion processing for converting a logical address to a physical address during writing of data. A flash memory module includes one or more flash memory chips and a flash memory controller for controlling the reading and writing of data of the flash memory chip. The flash memory controller performs the logical-physical address conversion processing. Further, the flash memory controller saves the information for logical-physical address conversion processing as a logical-physical address conversion table. In the following description, the logical-physical address conversion processing is also referred to as logical-physical conversion, and the logical-physical address conversion table is also referred to as a logical-physical conversion table.

The logical-physical conversion plays an important role in using the flash memory efficiently. When a logical-physical conversion with limited degree of freedom is used, the size of the logical-physical conversion table can be suppressed, but the performance is deteriorated due to frequent reclamation. On the other hand, when a logical-physical conversion with high degree of freedom is used, the size of the logical-physical conversion table will be increased and the control costs will be raised significantly.

Various methods are proposed as the above-described logical-physical conversion system depending on the aim of the operation, and one of the most widely known methods relates to dividing the address space provided to a higher level device into page sizes of the flash memory, thereby creating logical units, and mapping the respective logical units to the respective pages of the flash memory. This method is advantageous in that the page sizes are set to 2 KB (kilobytes), 4 KB, 8 KB and so on which are storage units that match well with the I/O pattern from the host OS, the file system or the application program, and therefore, optimization is facilitated, in that the logical units and the pages can be matched in a one-to-one relationship to facilitate management, and in that the extend-over of pages in logical units is suppressed so that the frequency of reading multiple pages can be reduced. This logical unit is sometimes called a logical page, and the page of the flash memory is called a physical page to distinguish the same from the logical page.

On the other hand, it is possible to consider a case where the logical page size and the physical page size do not correspond. At first, we will consider a case where the final size is varied due to compression or other data conversion processing. The reduction of bit costs in a flash memory is a major goal in the aim of replacing HDDs, and the technique of data compression is applied widely to the flash storage.

Another case that must be considered is where the ratio of data protection information such as ECC within the physical page is increased and the data quantity capable of being stored is reduced thereby. Conventionally, the ECC was stored in a spare area of the physical page in order for the data storage area to maintain a power-of-two size, but along with refinement, the flash memory is required to have a high error-correcting ability, and the required ECC size is expanding.

Further, the properties of the flash memory are not uniform for all physical pages, and there are innate differences or differences caused by physical locations. Therefore, it may be possible to adopt the most suitable storage method depending on the condition, without using the same ECC for all physical pages. However, in that case, the differences between logical page size and physical page size become more significant.

If the system attempts to perform a one-to-one mapping of logical pages and physical pages even when the logical and physical page sizes differ, at first, it is required that the logical page size is smaller than the physical page size. In addition, since it is not possible to store multiple logical pages in a physical page, in some cases, it may be necessary to perform padding of the physical page with invalid data, so that the storage efficiency is deteriorated.

On the other hand, if the logical page is allowed to extend over multiple physical pages, padding can be minimized and the storage efficiency can be improved, but a more complicated management method becomes necessary. For example, Patent Literature 1 discloses dividing a logical page stored across multiple physical pages into sub-blocks, and the storage information of each of the divided logical pages are managed so as to allow a single logical page to be stored across multiple physical pages.

CITATION LIST

Patent Literature

[PTL1] Specification of U.S. Pat. No. 7,529,905

SUMMARY OF INVENTION

Technical Problem

Similar to the case of physical pages in the flash memory, there are much advantages in matching the logical page size to the physical page size in a device having write units. However, it is necessary to consider a case where the logical page size and the physical page size become inconsistent due to reasons such as compression and other data conversion, or expansion of ECC size due to the physical characteristics of the device. When the system does not allow a logical page to extend over multiple physical pages, the non-used areas in the physical pages will increase and the storage efficiency will be deteriorated. On the other hand, when the system allows extend-over of multiple physical pages, the extend-over information must be retained in some form. As disclosed in Patent Literature 1, a method can be adopted to retain the extend-over information for each logical page, but in that case, two or more address information becomes necessary for each logical page, and the size of the management information is increased thereby.

Solution to Problem

The flash memory storage device according to the present invention comprises a controller and multiple flash memory chips. The controller divides a logical storage space being provided to the higher level device into logical pages units which are determined size areas for management, and manages a virtual address space which is a linear address space to which multiple physical blocks included in the multiple flash memory chips are mapped. When a data is written to a logical page from a higher level device, an unused area in the virtual address space is selected, and the correspondence between an address of the selected unused area in the virtual address space and the logical page is recorded in a page mapping table. During selection of an area from the virtual address space, any arbitrary area can be selected as long as it is an unused area, and there is no need to be conscious of the physical page boundaries.

Advantageous Effects of Invention

The present invention enables to store data in a storage device having write units in logical management units that differ from the write units to be stored to extend over write unit boundaries, according to which the storage efficiency is improved. Moreover, even when the logical management unit data is stored to extend over write unit boundaries, the present invention enables to manage information of the storage position in the storage device of the data in logical management units, without increasing the size of the management information.

BRIEF DESCRIPTION OF DRAWINGS

FIG. 7 illustrates a page-based logical-physical conversion table.
FIG. 11 illustrates a configuration of a page mapping table.
FIG. 12 illustrates a configuration of a virtual address configuration information.
FIG. 17 illustrates a configuration of a page mapping table according to Embodiment 2 of the present invention.

FIG. 22 illustrates a configuration of a virtual address configuration information according to the FMPKG of Embodiment 3 of the present invention.

FIG. 23 illustrates a flow of a lookup processing according to the FMPKG of Embodiment 3 of the present invention.

FIG. 24 illustrates a flow of a new group configuration processing according to the FMPKG of Embodiment 3 of the present invention.

DESCRIPTION OF EMBODIMENTS

Now, the preferred embodiments of the present invention will be described with reference to the drawings. These embodiments are mere examples for carrying out the present invention, and are not intended to limit the technical scope of the present invention.

In the following description, various information according to the present invention are referred to as "aaa table", "aaa list" and so on, but the various information can also be expressed by data structures other than tables and queues. Therefore, the "aaa table", the "aaa queue", the "aaa list" and the like can also be referred to as "aaa information" to indicate that the information does not depend on the data structure.

The processes are sometimes described using the term "program" as the subject, but since the program is executed by a processor for performing determined processes using memories and communication ports, the processor is actually the subject of operation for executing determines processes. Further, a portion or all of the programs can be realized by a dedicated hardware.

In the present drawings, the common components are assigned with the same reference numbers. Further, regarding the common components, if it is necessary to identify the respective components, alphabets are attached to the end of the reference numbers, such as 999a and 999b, or independent numbers such as #1 and #2 are attached to the end of the reference numbers. Sometimes, the alphabets or numbers are omitted if necessary in the explanation.

The various programs described in the present specification can be provided via a program distribution server or a computer-readable storage media.

The present invention is not restricted to the following embodiments. The nonvolatile memory in the following embodiment is an FM (Flash Memory). The FM according to the present embodiment is an FM of the type where erasing is performed in block units and reading and writing is performed in page units, which is typically a NAND-type flash memory. However, the FM can be a flash memory other than the NAND type (such as an NOR type). Further, other types of nonvolatile memory, such as an MRAM which is a Magnetoresistive Random Access Memory, a ReRAM which is a Resistance Random Access Memory, or an FeRAM which is a Ferroelectric Random Access Memory or other semiconductor memories, or a phase-change memory, can be used instead of the FM.

<Embodiment 1>

Figure 1:
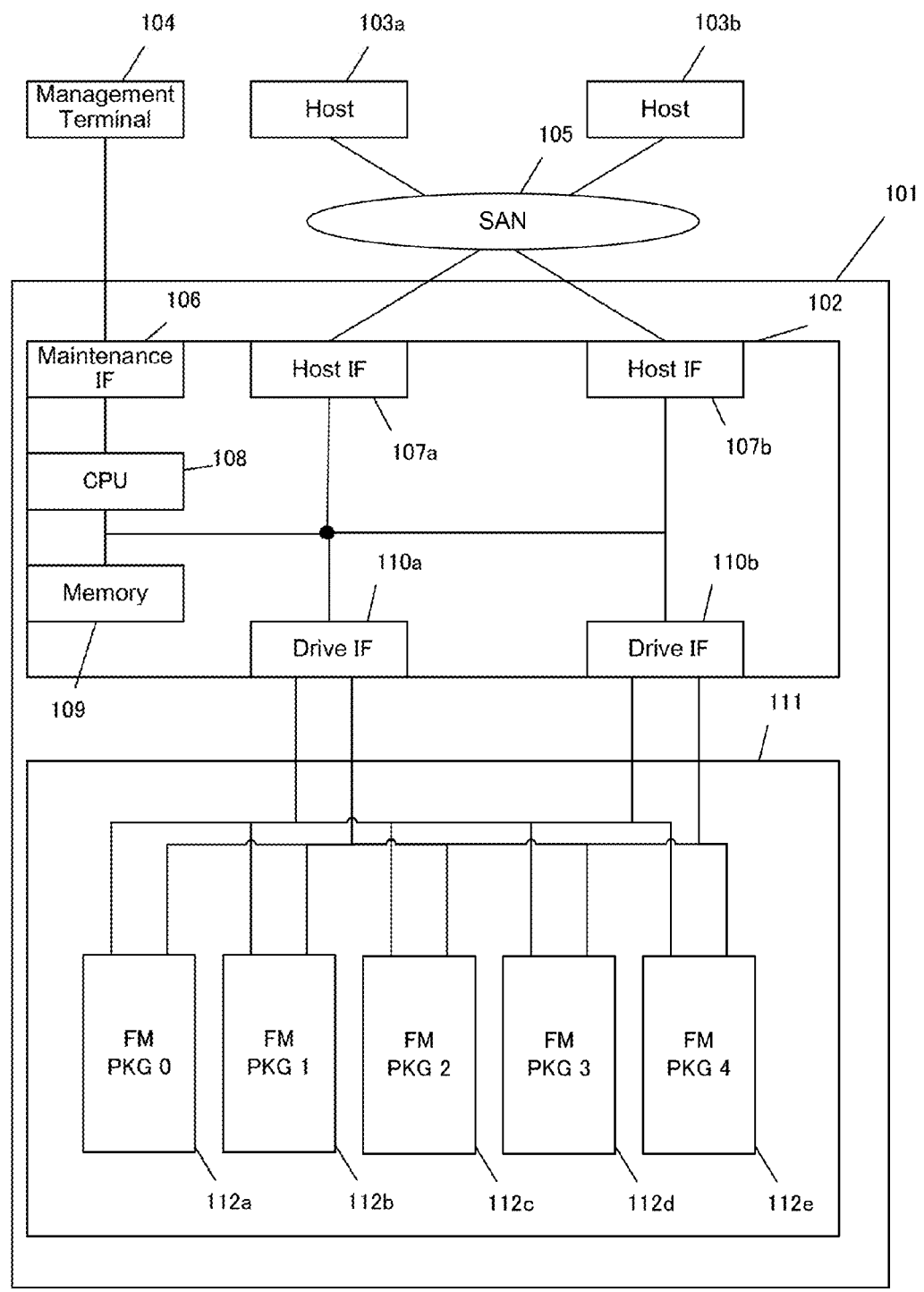
FIG. 1 illustrates a configuration of a storage system.

FIG. 1 illustrates a configuration of a computer system according to Embodiment 1 of the present invention.

A computer system is composed of a storage system (storage device) 101, one or more host computers (abbreviated as "host" in the drawing) 103, and a management terminal 104. The host computers 103a and 103b are respectively connected via a SAN (Storage Area Network) 105 to the storage system 101.

The storage system 101 includes a storage controller 102 and multiple flash memory storage devices 112 which are nonvolatile memory storage devices. In the drawing and the following description, the flash memory storage devices are sometimes referred to as FMPKG (Flash Memory Packages). In the present embodiment, there is only one storage controller 102, but the number of storage controllers 102 can be two or more in order to realize a redundant configuration.

The storage controller 102 is composed of a CPU (Central Processing Unit) 108, a memory 109, multiple host interfaces (hereinafter abbreviated as "host IF") 107, multiple drive interfaces (hereinafter abbreviated as "drive IF") 110, and a maintenance interface (hereinafter abbreviated as "maintenance IF") 106. The respective units within the storage controller 102 are connected via a bus. The memory 109 has an area for storing a program for controlling the storage system 101 and an area as a cache memory for storing data temporarily. The CPU 108 controls the storage system 101 according to the program stored in the memory 109.

The host IF 107 is an interface for communicating with a computer 103. The drive IF 110 is an interface for realizing communication between the storage controller 102 and the FMPKG 112. The maintenance IF 106 is an interface for connecting with the management terminal 104 and communicating with the management terminal 104.

An administrator performs management or maintenance of the storage controller 102 from the management terminal 104. However, the management terminal 104 is not an indispensible element, and management or maintenance of the storage controller 102 can be performed from the host computer 103, for example.

In the above-described computer system, the host computer 103 and the FMPKG 112 are connected via the storage controller 102, but it is possible to omit the storage controller 102, and to have the host computer 103 and the FMPKG 112 directly connected.

Now, the configuration of the FMPKG 112 will be described. Incidentally, the basic configurations of the respective FMPKGs 112 are the same.

Figure 2:
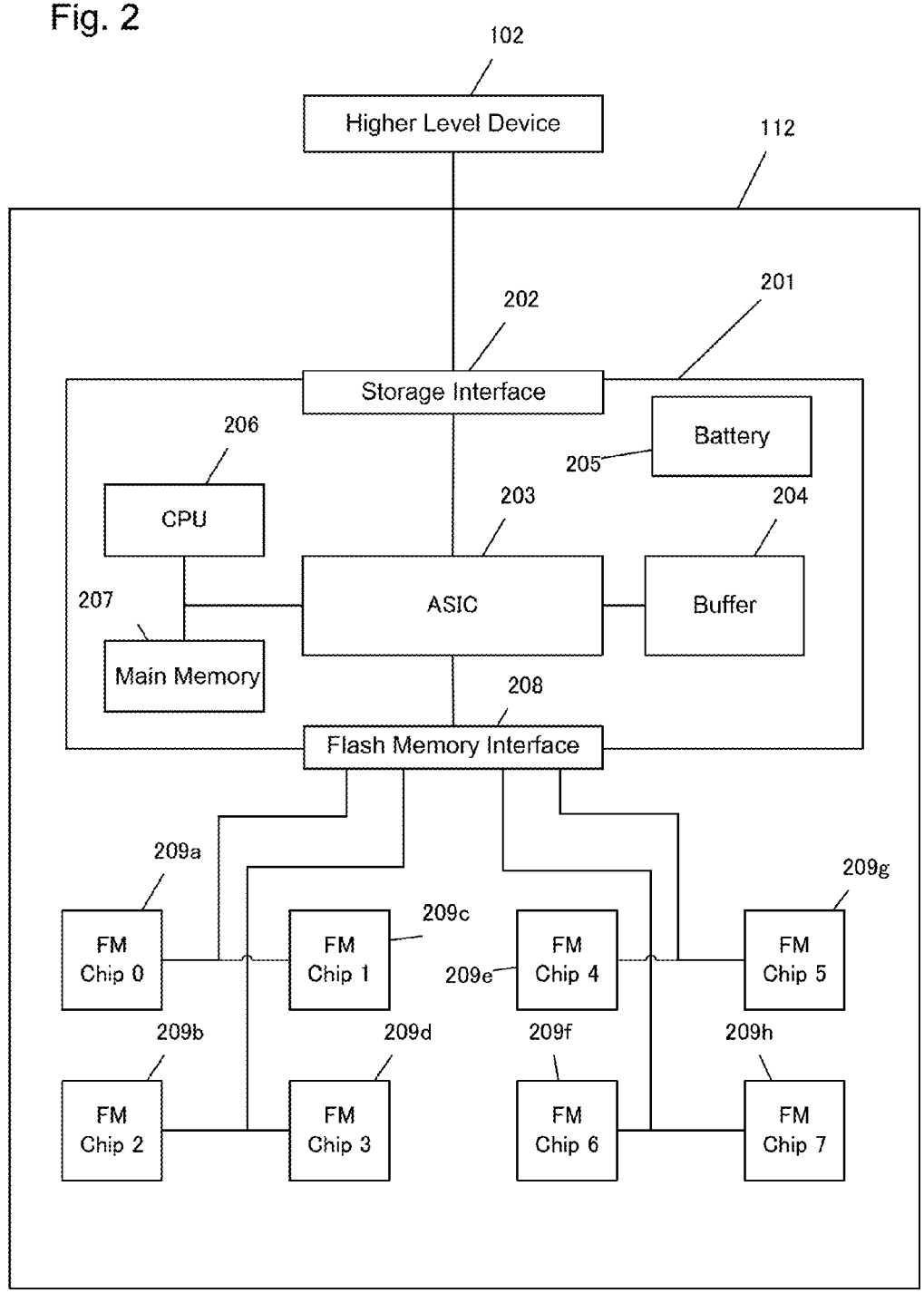
FIG. 2 illustrates a configuration diagram of FMPKG.

FIG. 2 illustrates a configuration of the FMPKG 112.

The FMPKG 112 is composed of a flash memory control device 201, and one or more flash memory chips (also referred to as FM chips) 209a through 209h. As mentioned earlier, it is possible to utilize other types of nonvolatile memory devices in place of the FM chips.

The flash memory control device 201 is composed of a storage interface 202 for connecting the FMPKG 112 with a higher level device such as the storage controller 102 or the host computer 103 illustrated in FIG. 1 (hereafter, the storage controller 102 or the host computer 103 is referred to as "higher level device 102") which issues a data access request to the FMPKG 112, an ASIC 203, a buffer 204, a battery 205 for supplying power during emergencies, a CPU 206, a main memory 207, and a flash memory interface 208 for connecting with the flash memory.

The CPU 206 is a processor controlling the overall flash memory control device 201, which operates based on a microprogram stored in the main memory 207. For example, data is read from or written to a flash memory chip 209 by referring to the logical-physical conversion table stored in the main memory 207 with respect to the received I/O. Further, reclamation and wear levelling is executed in response to the status of use of the flash memory.

The ASIC 203 is controlled via the CPU 206, and executes reading and writing of data with respect to the flash memory chip 209. Further, communication with a higher level device is controlled by the storage interface 202, similar to the flash memory chip 209.

In the drawing, the CPU 206 is externally connected to the ASIC 203, but the ASIC 203 can also be composed of a single LSI including the CPU 206, the storage interface 202 and the flash memory interface 208.

The main memory 207 and the buffer 204 are volatile storage areas capable of realizing high-speed accesses, an example of which is a DRAM, for example. The main memory 207 is a work space that the CPU 206 directly uses for control, which provides a shorter latency than the buffer 204. On the other hand, the buffer 204 can be used as a buffer of user data, or to store a large-sized table that cannot be stored in the main memory 207.

In the present drawing, the main memory 207 and the buffer 204 are illustrated as separate components, but they can be provided as a single memory device.

The storage interface 202 connects the higher level device and the flash memory control device 201 for communication. A storage interface such as SATA, SASA or FC, or an interface such as PCI Express, can be adopted as the interface.

The internal architecture of the flash memory control device 201 is not necessary restricted to the one illustrated in the drawing, and the respective functions can be substituted by one device or multiple devices.

Figure 3:
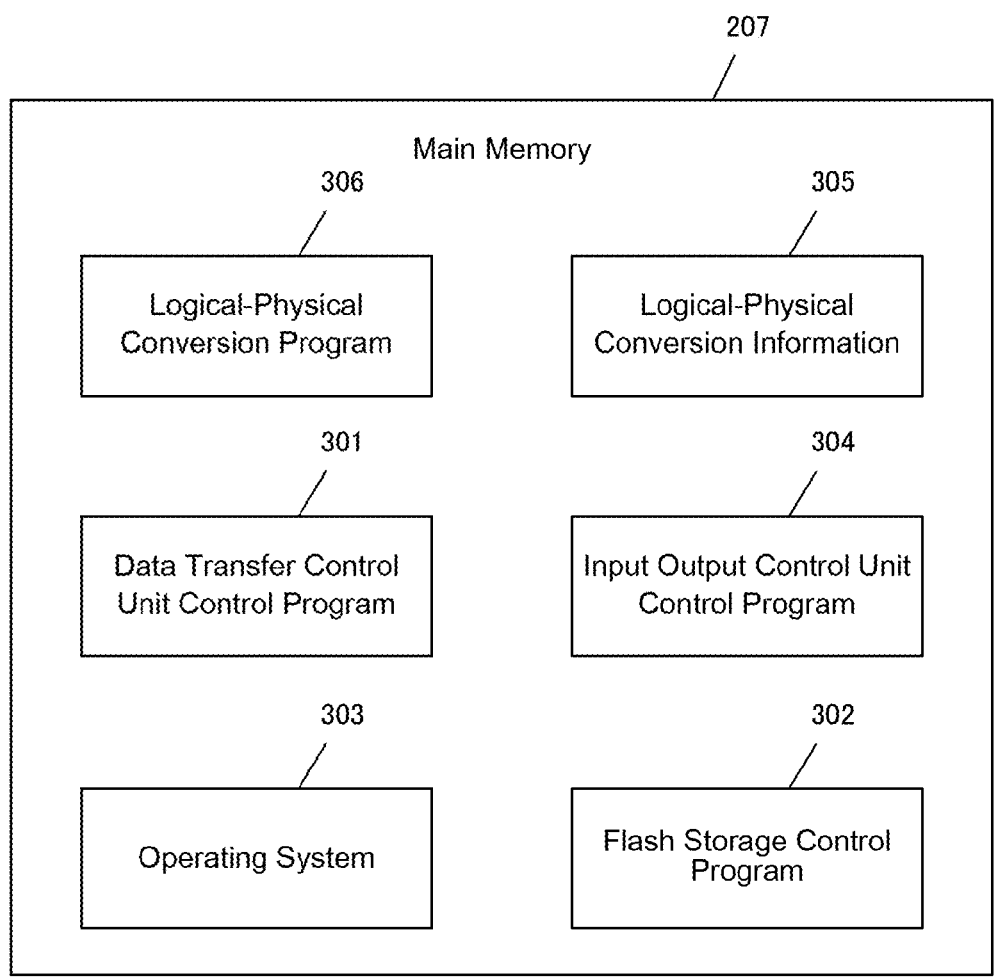
FIG. 3 illustrates a content of a main memory of a flash memory storage.

FIG. 3 illustrates one example of the information stored in the main memory 207 of the FMPKG 112.

The main memory 207 stores, for example, an operating system 303, a flash storage control program 302, a data transfer control unit control program 301, an input/output control unit control program 304, a logical-physical conversion program 306 and a logical-physical conversion information 305.

The operating system 303 is a program for performing basic processes such as scheduling when the CPU 206 executes various programs.

The flash storage control program 302 is a program used to perform control so that the flash memory control device 201 operates as a storage device, such as when the flash memory control device 201 manages volumes (or storage spaces of volumes) provided to higher level devices or manages the buffer memories.

The data transfer control unit control program 301 is a program used for controlling the ASIC 203.

The input/output control unit control program 304 is a program used for controlling the storage interface 202 and the flash memory interface 208.

The logical-physical conversion program 306 is a program for converting a logical address included in an input/output request (I/O request) issued from the higher level device 102 to a physical address which is a physical position in the flash memory. The "logical address" according to the present embodiment can be, for example, an LBA (Logical Block Address). Further, the "physical address" can be, for example, an address (page number, block number) for uniquely identifying a physical page and/or a physical block within the FMPKG 112.

The logical-physical conversion information 305 is information for conversion used when the logical-physical conversion program 306 is operated.

Figure 4:
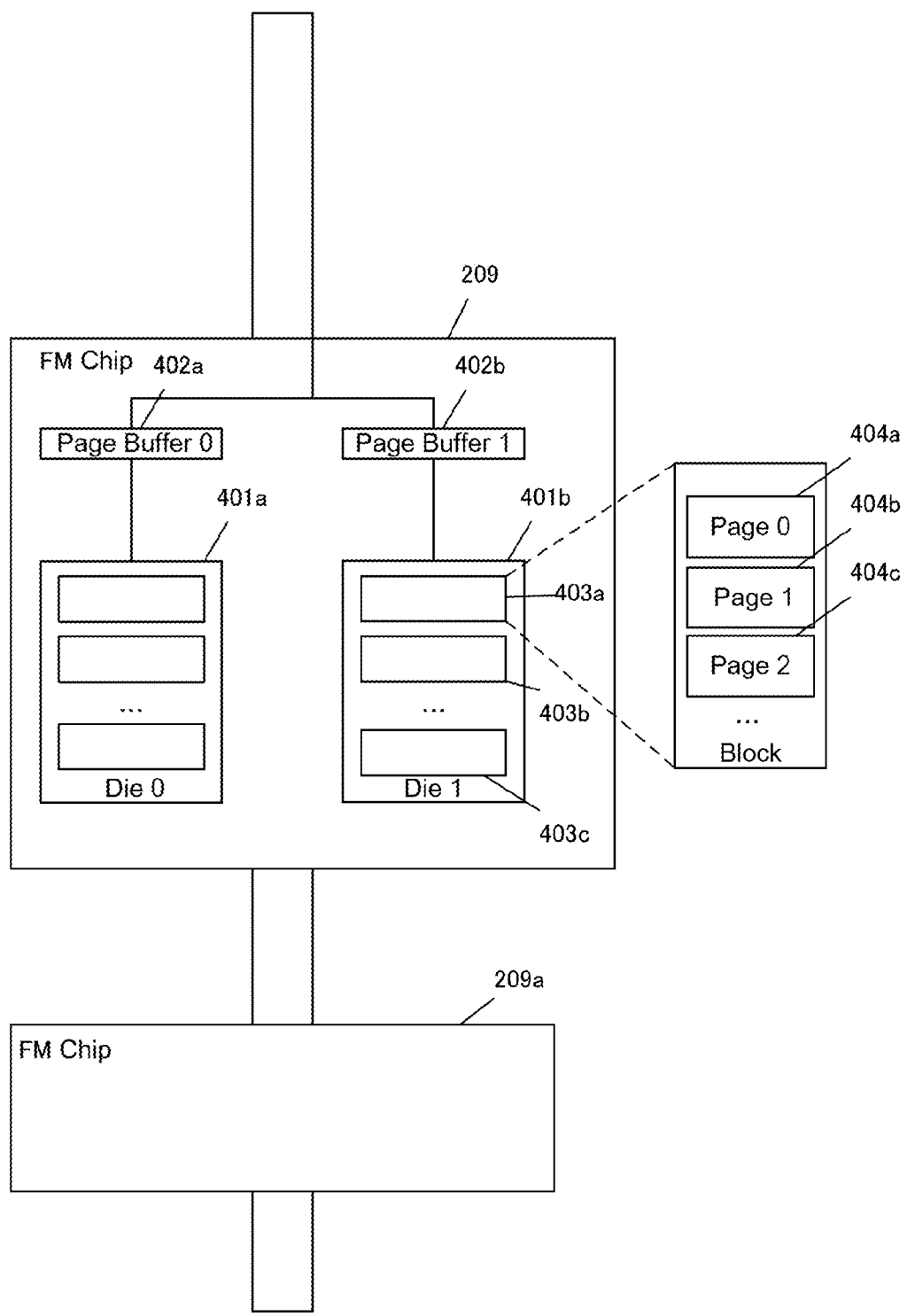
FIG. 4 illustrates a relationship between blocks and pages of a flash memory.

FIG. 4 illustrates an internal configuration of the flash memory chip 209.

The flash memory chip 209 includes multiple dies (DIEs) 401a-b, and page buffers 402a-b for temporarily storing target data of the flash memory I/O command issued from the flash memory control device 201. Each die 401 has one or more (such as 128 or 256) physical blocks 403a-c, which are actual storage areas.

Each physical block 403 is an erasable unit in the flash memory. Each physical block 403 is composed of one or more physical pages 404a through c. Each physical page is a writable/readable unit in the flash memory.

Writing refers to writing data to an already-erased physical page, and reading refers to reading data written in the physical page. Generally, it is not possible to rewrite data to a physical page to which data has already been written, so that when rewriting data to a physical page, it is necessary to erase data in the unit of a physical block 403 including that physical page. Through the erasing process, the data stored in the physical page 404 included in the physical block 403 is erased, so that writing becomes possible again. It is not possible to erase only one physical page. Write, read and erase commands are received via the flash memory interface 208 connecting the flash memory chip 209 and the flash memory control device 201.

Figure 5:
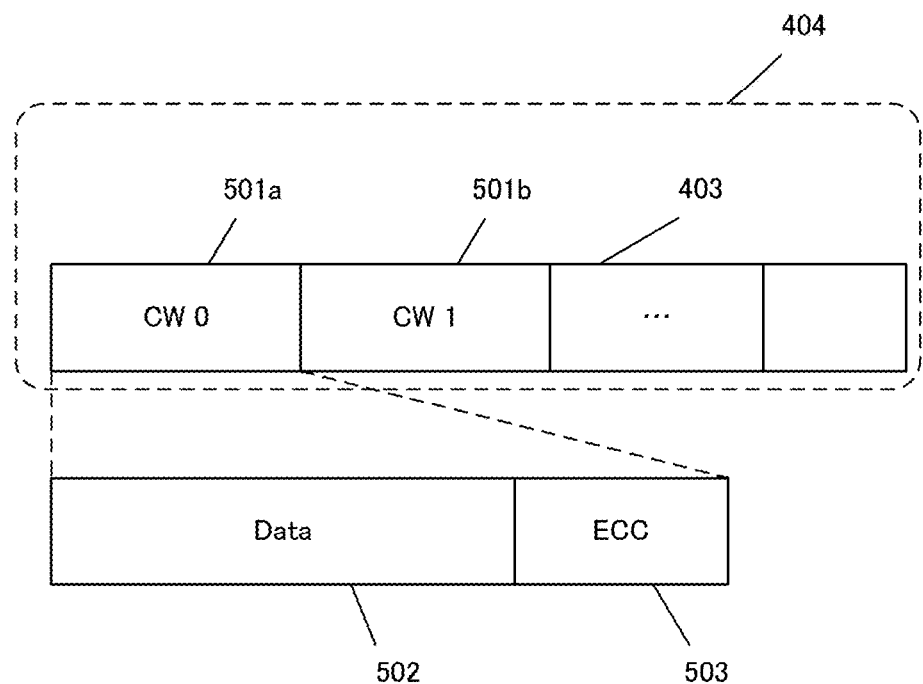
FIG. 5 illustrates a general data storage configuration within a physical page.

FIG. 5 illustrates a general data storage configuration within the physical page 404.

A code word (CW) 501 is a set composed of data 502 and an ECC 503 protecting the same, which is an error-correcting unit. One or more CWs exist in a physical page. Generally, a physical page retains a spare area in addition to an area corresponding to the number of bytes of a power of two, and in this spare area are stored ECC and metadata. Metadata is not illustrated in the present example, but it can be stored therein. The size of the ECC is determined according to the level of reliability required in the chip, so that in some cases, it may not be possible to ensure a data area size corresponding to the value of power of two within a single physical page. In the following description, the term physical page size refers to the size of the area storing user data, excluding the area storing the ECC and the metadata, from the physical page size of the original FM.

Figure 6:
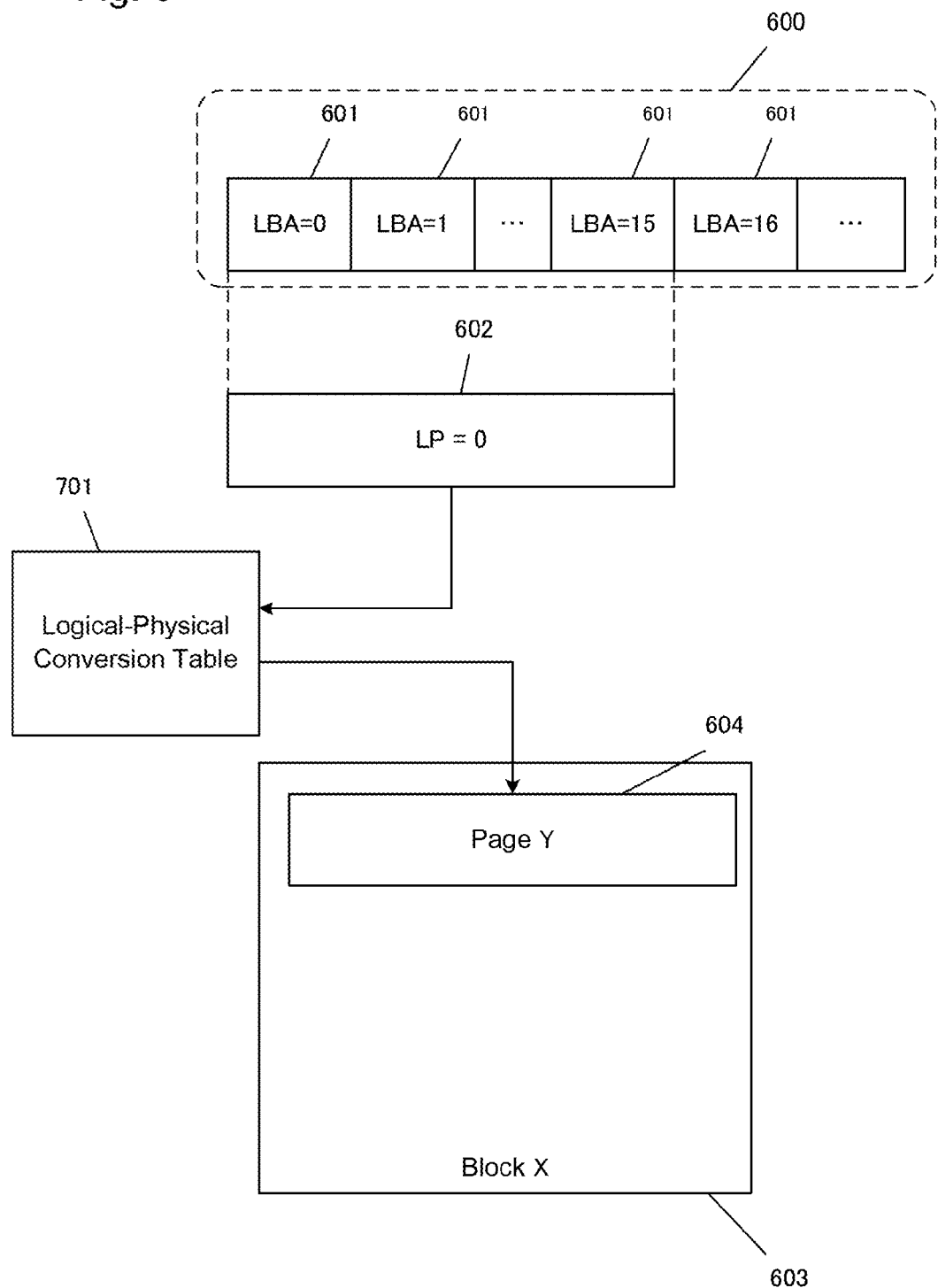
FIG. 6 illustrates an outline of page-based logical-physical conversion processing performed in a conventional flash storage.

FIG. 6 illustrates an outline of a page-based logical-physical conversion processing performed in conventional flash storages. Element 600 in the drawing shows a storage space of the volume that the flash storage provides to a higher level device, and each sector (element 601 in the drawing) which is a minimum access unit when the higher level device accesses the storage area of the flash storage is provided with an address starting from zero, and the address is referred to as a logical block address (LBA). Generally, the size of a single sector is 512 bytes, but it can be other sizes (such as 520 bytes). The flash storage divides a storage space that the flash storage provides to a higher level device into given sizes (such as 16 sectors in the example illustrated in FIG. 6) from the beginning, and each divided area is managed as a "logical page" (element 602 in the drawing). Further according to FIG. 6, page Y (604) within block X (603) shows a physical page.

In conventional flash storages, the sizes of all logical pages 602 and all physical pages 604 are fixed (16 sectors, that is, 8 KB, in the example of FIG. 6), and the sizes of logical page 602 and physical page 604 are the same. Therefore, a single logical page 602 is uniquely mapped to an arbitrary single physical page 604, and the information regarding the mapping thereof is managed by the logical-physical conversion table 701. Upon writing data to a certain logical page 602, an unused physical page 604 is newly acquired, update data of the relevant logical page 602 is written to the unused physical page 604, and the mapping is updated. The old physical page 604 no longer referred to by the logical page 602 is registered as an invalid page, collected and erased through reclamation, and reused as a free page.

FIG. 7 illustrates one example of a configuration of a logical-physical conversion table 701 for performing page-based logical-physical conversion. This table is a table normally used in a conventional flash storage.

The logical-physical conversion table 701 is a table for managing the addresses of physical pages 604 corresponding to the respective logical pages 602, which stores a logical page number (702) of the respective logical pages 602, and retains an address (storage address) 703 of the physical page 604 associated with the logical page 602 of the relevant logical page number 702. For example, if the flash storage provides a storage space of a size corresponding to N logical pages for the higher level device, it means that N entries exist. When the storage destination of the logical page 602 is changed to a different physical page 604, the information of the storage address 703 of this table is updated.

Figure 8:
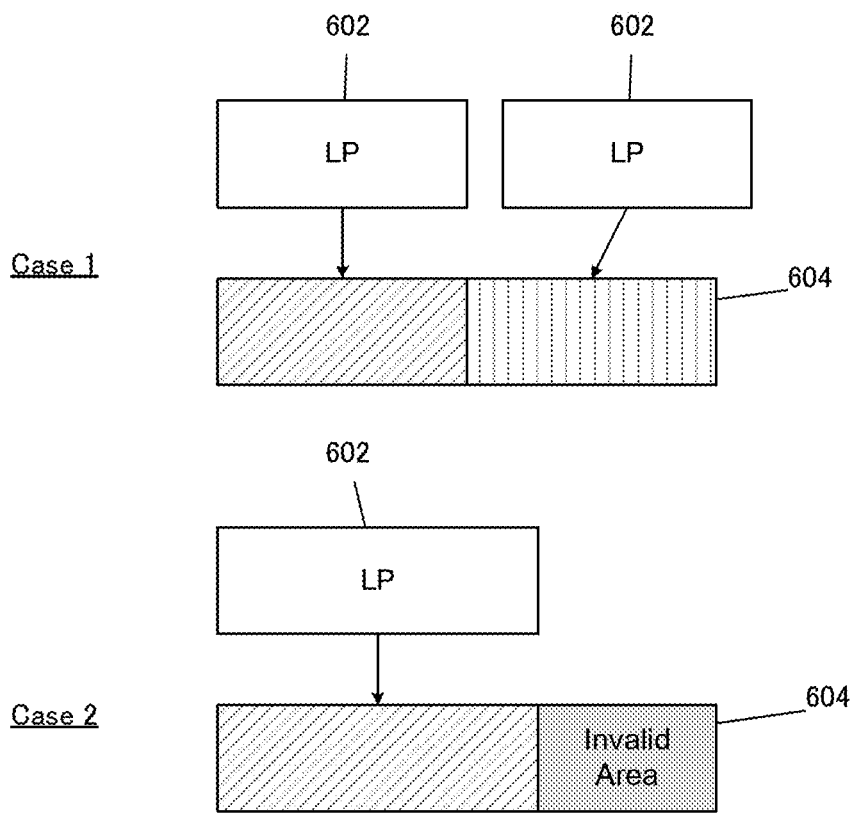
FIG. 8 illustrates a storage state where the logical page size and the physical page size differ.
Figure 9:
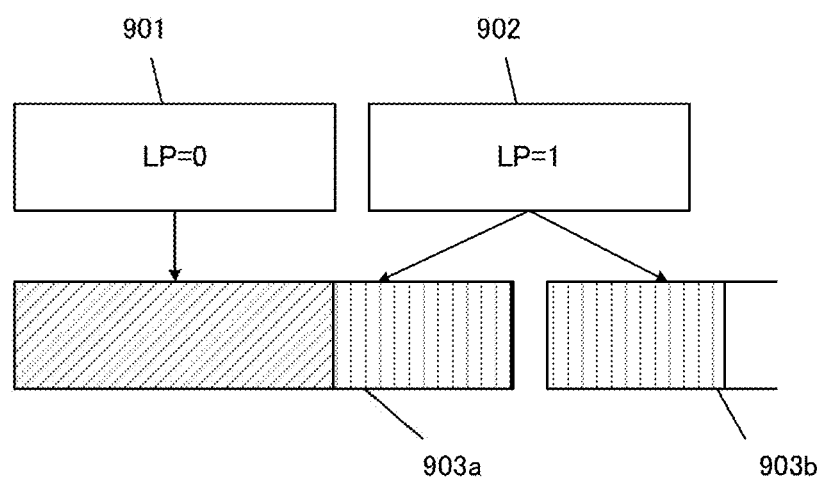
FIG. 9 illustrates a storage state where a single logical page extends over multiple physical pages.

Next, with reference to FIGS. 8 and 9, we will describe the problems of a case where the logical page size differs from the physical page size. Case 1 of FIG. 8 illustrates an example where the logical page size is half the physical page size, and Case 2 illustrates an example where the logical page size is greater than half the physical page size.

As in Case 1 of FIG. 8, when the logical page size is half the physical page size, or if the size is 1/power-of-two, such as 4/1 or 8/1 of the physical page size, multiple logical pages will fit exactly in a single physical page. Therefore, if the logical page size is 1/power-of-two of the physical page size, it is possible to divide the physical page into areas having an equivalent size as the logical page size (which is assumed to be referred to as "slots") for management, and the logical-physical management table shown in FIG. 7 can cope with such case by simply changing it to manage the mapping between the logical page numbers of the respective logical pages and the slots within the physical pages. However, as in Case 2 of FIG. 8 where the logical page size is not equivalent to the 1/power-of-two of the physical page size, an area (invalid area) where a single logical page cannot be stored exactly is necessarily created in the physical page. If a storage form is adopted where a logical page cannot be mapped to two or more physical pages, such areas will become invalid. When such invalid area is increased, the storage efficiency will drop, and the bit cost will be deteriorated (bit cost will be raised).

FIG. 9 illustrates a data storage configuration of a case where a single logical page is stored across multiple physical pages.

As described earlier, if the logical page size and the physical page size differ, an invalid area will be created in the physical page where a single logical page cannot be completely stored. In order to prevent such invalid area from being formed in the physical page, a method can be adopted where a single logical page is stored across multiple physical pages, but such method has the following drawbacks. There is a case where the logical page fits in a single physical page (such as the logical page 901 of FIG. 9) and a case where the logical page is stored in two or more physical pages (such as the logical page 902 of FIG. 9). In order to manage the address of a physical page corresponding to a logical page, since the logical page (LP=0) 901 is stored in a single physical page, it is only necessary to store the address of a physical page storing the relevant logical page and the information of an offset position within the physical page regarding the logical page 901. On the other hand, since the logical page (LP=1) 902 extends over two physical pages 903a and 903b, in managing the address of the physical page corresponding to the logical page, it is necessary to manage information showing that the former half of the logical page (LP=1) 902 (such as from 0-th byte to a-th byte of the logical page) is stored in a portion of the physical page 903a (from x-th byte to the end), and the latter half of the logical page (LP=1) 902 (such as from (a+1)-th byte to the end of the logical page) is stored in a portion of the physical page 903b (from 0-th byte to y-th byte). In other words, in order to manage information related to a single logical page, it is necessary to register two entries regarding the information (logical-physical conversion table) for managing the correspondence between the logical page and the physical page, so that the size of the logical-physical conversion table will be increased.

Next, we will describe the management method of the mapping between the logical pages and the physical pages in the FMPKG 112 according to Embodiment 1 of the present invention. According to FMPKG 112 of Embodiment 1 of the present invention, the sizes of the respective logical pages are the same, and the sizes of the respective physical pages are also the same. However, the size of the logical page is not equal to the size of the physical page (even if the size of the logical page is equal to the size of the physical page, the FMPKG 112 illustrated in the present embodiment is operable, but in the following description, we will assume that the size of the logical page is not equal to the size of the physical page).

Figure 10:
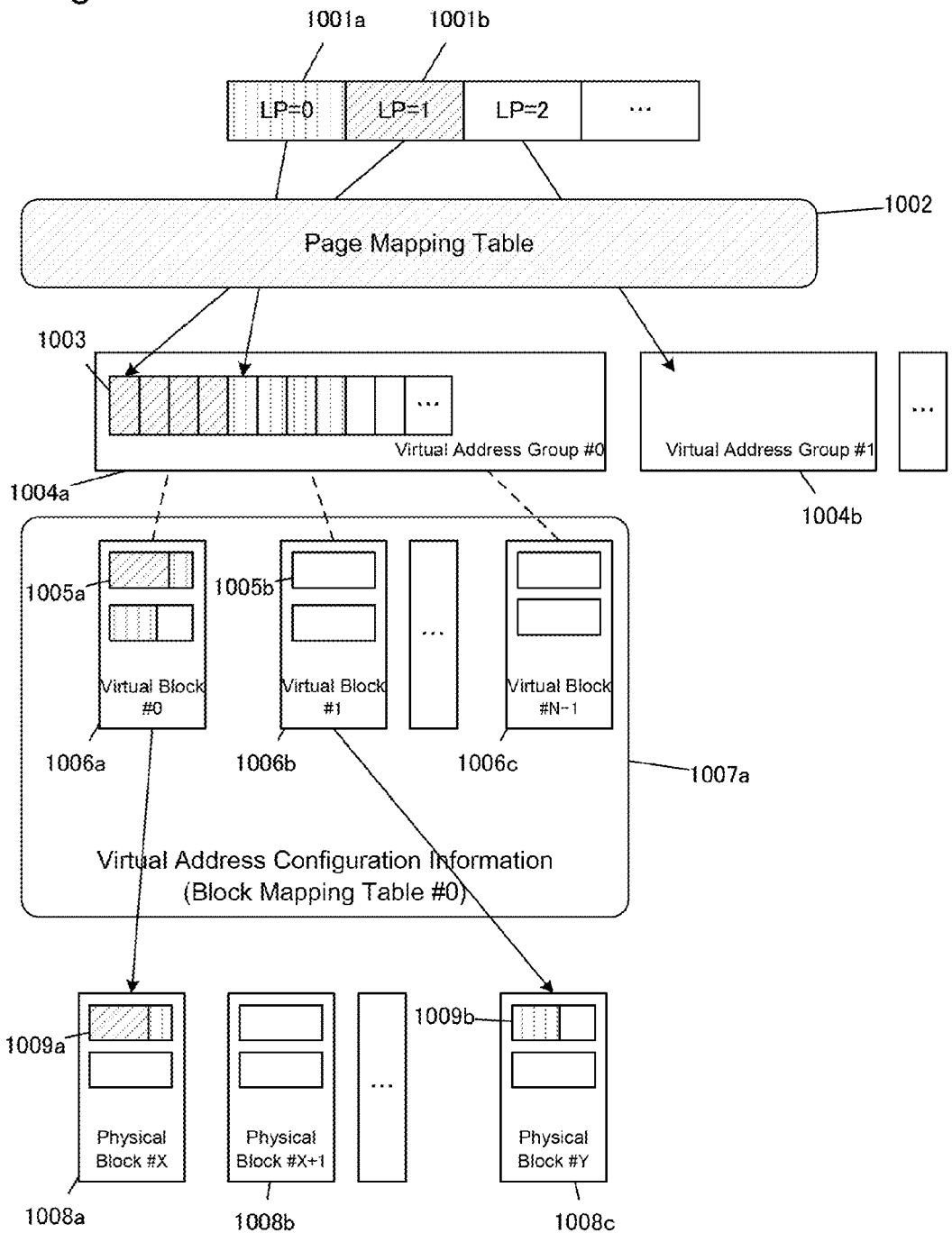
FIG. 10 illustrates a concept of logical-physical conversion performed in the FMPKG according to Embodiment 1 of the present invention.

FIG. 10 illustrates a concept of logical-physical conversion executed by the FMPKG 112. The logical-physical conversion executed by the FMPKG 112 is the combination of the concept of page-based logical-physical conversion described with reference to FIGS. 6 and 7 and the concept of virtual address space. Although not shown in FIG. 10, similar to FIG. 6, the FMPKG 112 provides a one-dimensional logical storage space (corresponding to 600 of FIG. 6) addressed by the logical block address (LBA) starting from address 0 to a higher level device, divides the one-dimensional logical space from the beginning into given sizes (such as 16-sector sizes), and manages the respective divided areas as logical pages. In other words, the area from address 0 to address 15 of the logical block address of the one-dimensional logical storage space is mapped to a logical page 1001a having a logical page number (LP) 0, and sequentially thereafter, the area from address 16 to address 31 of the one-dimensional logical storage space is mapped to the logical page 1001b where the logical page number (LP) is 1, and the area from address 32 to address 47 of the one-dimensional logical storage space is mapped to the logical page where the logical page number (LP) is 2. The logical page size can be any arbitrary size, but since the FMPKG 112 updates data in logical page units (even if there is a write request of data having a size smaller than the logical page size, the whole logical page including that data is rewritten), it is preferable to select a data size (such as 4 KB or 8 KB) designated by the I/O request issued by the OS, the file system or the application program operating in a higher level device such as a host computer 103.

According to the FMPKG 112 of Embodiment 1 of the present invention, the correspondence between the logical page and the physical page is not directly managed, and each logical page (1001a, 100b, . . . ) is mapped to an address in a virtual address space 1003, which is a one-dimensional address space only used within the FMPKG 112. The information related to the correspondence between the logical page and the address in the virtual address space 1003 is managed through use of a page mapping table 1002 (FIG. 11) described later. The virtual address space 1003 is a one-dimensional linear address space unconscious of physical page boundaries, and the FMPKG 112 manages the information constituting this virtual address space 1003 through use of a virtual address configuration information 1007 (FIG. 12) described later. What is meant by the virtual address space 1003 being an address space unconscious of physical page boundaries is that when the logical page is mapped to the virtual address space 1003, the logical page can simply be mapped to an arbitrary free space in the virtual address space (area in the virtual address space having no logical page mapped thereto) without any consideration on preventing the logical page from being stored across physical pages, for example.

The number of virtual address space 1003 defined in the FMPKG 112 is not limited to one, and can be two or more. If multiple virtual address spaces exist, in the present specification, the respective virtual address spaces are referred to as virtual address groups 1004 (hereafter, virtual address groups may also be simply referred to as groups). Each group has a single virtual address configuration information 1007 associated therewith. If multiple groups exist, the respective logical pages can be associated with an address of any arbitrary group.

The virtual address space 1003 is divided into the same size as the physical block 1008 of the FM, and each divided area is called a "virtual block 1006". Each virtual block 1006 has a unique identification number (called a virtual block number) assigned within a virtual address group 1004. A virtual block (1006a of FIG. 10) at the beginning of the virtual address group 1004 has address 0 assigned as the virtual block number, and sequentially, address 1, address 2 and so on are assigned as virtual block numbers to the second area and subsequent areas.

Each virtual block 1006 is mapped via a one-to-one relationship to the physical block 1008 in the FM (corresponding to 403 of FIG. 4). This mapping information is managed by the virtual address configuration information 1007. Thereby, multiple physical blocks are mapped to the virtual address space 1003.

As recognized, for example, the information that physical pages 1009a and 1009b of FIG. 10 are composed of the same virtual address space is stored in block units, not page units. Thus, there is no more need to retain the information on the relationship between physical pages for each logical page, and the management information can be reduced significantly. However, since it is not allowable to store the data of a single logical page to extend over multiple groups, there occur areas near the final address of a group where user data is not stored, considering boundaries. These areas can be set as invalid areas, or can be used as areas storing some type of management information.

In the above description, a physical block is assumed as an element constituting the virtual address space, but the aim of reducing the amount of management information can be realized as long as the element is a physical address component bigger than the physical page. However, there is a great advantage from the viewpoint of management to have the space associated with physical blocks which are erase units. For example, in order to erase a certain physical block, if the physical block is shared among multiple groups, copying must be executed for each group. In addition, even if the process that had conventionally been performed in physical block units is expanded to group units, the physical block should not be shared among groups. In the following description, a physical block is assumed as the element constituting a group.

FIG. 11 shows a configuration of a page mapping table 1002 managed by the FMPKG 112 according to Embodiment 1. The page mapping table 1002 is a table defined for each FMPKG 112 for managing the correspondence between the logical page and the address in the virtual address space 1003 (hereinafter, the address in the virtual address space is called "virtual address"). Further, the page mapping table 1002 constitutes one of the information included in the logical-physical conversion information 305 of the main memory 207. The virtual address being set for each logical page is composed of a virtual address group number (group #) 1102 and an offset address 1103 within the group. The offset address 1103 stores a relative address setting the address of a beginning sector of a group specified by the group #1102 to zero. When the respective logical pages are in an initial state, that is, when data is not written in the logical pages, no value is stored in the group #1102 and the offset address 1103. When a request to write data to the logical page is received from the higher level device, the FMPKG 112 determines a non-written area address (group number and offset address within group) in the virtual address space to be associated with the relevant logical page, and stores the value in the group #1102 and the offset address 1103. Similarly, when the data in the logical page is updated (overwritten), the FMPKG 112 determines a non-written area address (group number and offset address within group) in the virtual address space, and stores the value in the group #1102 and the offset address 1103.

In the present embodiment, the offset address 1103 is in sector units, but it can be in other units. For example, it is possible to store an address setting the size of a single logical page as a single unit in the offset address 1103. Further, as described earlier, since it does not allow a logical page to extend over groups, a single logical page (logical page specified by logical page 1101) will not be mapped to multiple groups. Therefore, only the same number of rows (entries) as the number of logical pages managed by the FMPKG 112 exists in the page mapping table 1002.

FIG. 12 shows a configuration of a virtual address configuration information 1007 managed by the FMPKG 112 according to Embodiment 1. Similar to the page mapping table 1002, this information is also included in the logical-physical conversion information 305 of the main memory 207.

The virtual address configuration information 1007 retains, for each virtual address group (group 1201), a subsequent write position 1202 which is a pointer retaining the subsequent write position (in the present embodiment, the unit is in sectors, but other units can also be used), and a physical block number (physical block #) 1204 of multiple physical blocks constituting a virtual address space of the corresponding group. According to the FMPKG 112 of the present embodiment, a unique identification number within the FMPKG is assigned to each physical block within the FMPKG for management, and this identification number is called a physical block number. This physical block number is stored in the field of the physical block number 1204. Further, N numbers of physical block numbers 1204 are registered per single group, the physical block number registered to the beginning of each group is mapped to the virtual block number (1203) of address 0, and the respective physical blocks thereafter are mapped to virtual block numbers (1203) of address 1, address 2, and so on. The size of the physical block number N constituting the virtual address group determines the size of the address space within the virtual address group.

The subsequent write position 1202 is information showing the head of the non-written position in the corresponding virtual address group 1201. It will be described in detail later, but according to the FMPKG of the present embodiment, upon writing a write data from the higher level device 102 to the virtual address group (or the physical block/physical page mapped thereto), writing is performed by appending the write data to the head of the non-written area within the group. Further, when the FMPKG writes data to the physical block (or the physical page therein), data is written sequentially in order from the beginning page of the non-written data within the physical block (for example, if no data is written in the relevant physical block, the beginning page is a page having page number zero, and writing is performed sequentially to page numbers 1, 2, and so on). The writing of data to the physical pages of the subsequent physical block will not be performed until data is written in all physical pages within the physical block. Therefore, it means that the virtual address space specified via an address prior to the subsequent write position 1202 already stores data and is mapped to the logical page, and that the space specified by the address following the subsequent write position 1202 is an unused area, where data is not yet written and which is not mapped to a logical page. In the initial state, the value of the subsequent write position 1202 is zero, and when n sectors are written via write processing, value n is added to the subsequent write position 1202. When data is written (close) to the final physical page of the virtual address group, no more data can be written to the relevant virtual address group, so that a value showing that no data can be written thereto (N/A) is stored in the subsequent write position 1202.

Further, there is only one group where write is enabled in which a value greater than zero (in other words, a value that is not N/A) is stored in the subsequent write position 1202 of the virtual address configuration information 1007. When write data from a higher level device is to be stored, as a general rule, data is written into that group. In the following description, that group is called an "opened group" or "open group". A new group is constructed at the point of time when there is no more area to which data can be written within the opened group. When constructing a new group, (multiple) physical blocks constituting the group are selected, and the physical block numbers are stored in the field of the physical block number 1204. However, it is also possible to provide multiple open groups, so that an arbitrary open group can be selected when the FMPKG 112 writes data to the physical page.

According to the virtual address configuration information 1007 of Embodiment 1 of the present invention, the information related to the number of invalid pages 1205 and a last written time 1206 are retained for each group. A number of invalid pages 1205 stores the number of pages out of the physical pages within a group which have become invalid since data rewrite has occurred, and a last written time 1206 stores the time when data was last written to the relevant group. These information are used in reclamation (also abbreviated as RC in the present specification) or refresh (also abbreviated as RF in the present specification) processing. According to the FMPKG 112 of Embodiment 1 of the present invention, these information are managed in group units, but it is also possible to manage the information in other units, such as in physical block units. Further, information other than the number of invalid pages 1205 and the last written time 1206 can be managed for the purpose of RC and RF processing.

Next, with reference to FIG. 13, the flow of the conversion processing (lookup processing S1301) from the logical address to the physical address executed by the FMPKG 112 according to Embodiment 1 of the present invention will be described. Lookup processing S1301 is executed, for example, to compute a physical storage position (physical page) of the access target data of an access request when the flash storage control program 302 executed by the CPU 206 receives an access request such as a read request from the higher level device. In this case, the flash storage control program 302 calls the logical-physical conversion program 306 to have the CPU 206 execute the lookup processing S1301, and as a result of the lookup processing S1301, the logical-physical conversion program 306 returns a computed physical address information (a set of a physical block number and a physical page number within a physical block specified by the physical block number) to the flash storage control program 302 being the request source. The following description illustrates a process for computing a physical position of the area corresponding to a single logical page, assuming that an initial position of access target data designated by the read request corresponds to a logical page boundary and that the size of an access target data is equivalent to a single logical page size, but a similar process can be performed in other conditions to compute the physical storage position of access target data.

At first, the CPU 206 computes a logical page number of an access target logical page based on address (LBA) information of access target data included in the processing target command (S1302). The LBA can be computed by dividing the LBA of the access target data by the logical page size. Thereafter, the CPU 206 refers to the page mapping table 1002, specifies a row (entry) where the logical page 1101 matches the logical page number computed in S1302 (S1303), and acquires a group number 1102 of that row and the offset address 1103 within the group (S1304).

Next, the CPU 206 computes a virtual block number and an offset address within the virtual block (relative address when the address of an initial position of the virtual block is set to zero) based on the offset address 1103 acquired in S1304 (S1305). In S1305, the offset address 1103 acquired in S1304 is divided by the physical block size (which is derived by multiplying the physical page size by the number of pages within one physical block), wherein the quotient thereof is set as the virtual block number, and the remainder is set as the offset address within the virtual block. Then, in S1306, the CPU 206 refers to a row where a group 1201 is equal to the group number acquired in S1304 and the a virtual block number 1203 is equal to the virtual block number computed in S1305 by referring to the virtual address configuration information 1007, and acquires the corresponding physical block number (physical block #1204). It can be seen that access target data exists in a physical block specified by the physical block number acquired in S1306.

In S1307, the CPU 206 divides the offset address within the virtual block computed in S1305 by the physical page size to obtain a relative page number (page number when the beginning page number within the physical block is set to zero) within the physical block specified by the physical block number acquired in S1306, and computes the physical page number of the physical page (top physical page in which access target data is stored) to which the address contained in the access request from the higher level device corresponds. Further, in the case of the FMPKG 112 corresponding to the present embodiment, it may be possible to have a single logical page stored across multiple physical pages, so that the value having added "logical page size minus 1" to the offset address within the virtual block computed in S1305 is divided by the physical page size, the physical page number of the last physical page where the access target data is stored is computed, and the physical addresses (set of physical block number and physical page number) of the computed top physical page and the last physical page are returned to the request source, by which the process is ended (however, if the top physical page and the last physical page are the same, it means that the logical page is stored in a single physical page, and in that case, only one physical page number is returned to the request source). The request source having received the physical address performs certain processes, for example, reading data from the physical page corresponding to the received physical address and returning the same to a higher level device, if the process performed in the request source is a read processing.

Next, the flow of processing performed by the FMPKG 112 for storing the write data from the higher level device 102 to the physical page of the FM chip (write processing) will be described. When assuming that the write data is written in logical page units, the outline of the flow of write processing will be as follows. When the FMPKG 112 receives a write request and write data to a logical page, the FMPKG determines an address (group number and offset address within group) of a non-written area (area in a virtual address space to which no logical page is mapped yet) using the virtual address configuration information 1007, and registers the address information of the determined area to the field of the group 1102 and the offset address 1103 in the page mapping table. Then, one or more physical pages corresponding to the address of the determined non-written area are specified, and write data is stored in the specified physical page(s).

According to the FMPKG 112 of the present embodiment, basically, write data can be stored in logical page units to the physical pages by performing processes according to the above-described flow. However, since there is a limitation that the minimum unit of writing data to the FM chip is a page (physical page), the above-described processing may create an invalid area in the physical page. In the actual write processing, the data of multiple logical pages are first accumulated in the buffer 204 within the FMPKG 112, and then the gathered data is written into one or multiple physical pages so as not to create any invalid area in the physical page. Therefore, processing is performed in an order somewhat different from the above-described process.

Figure 14:
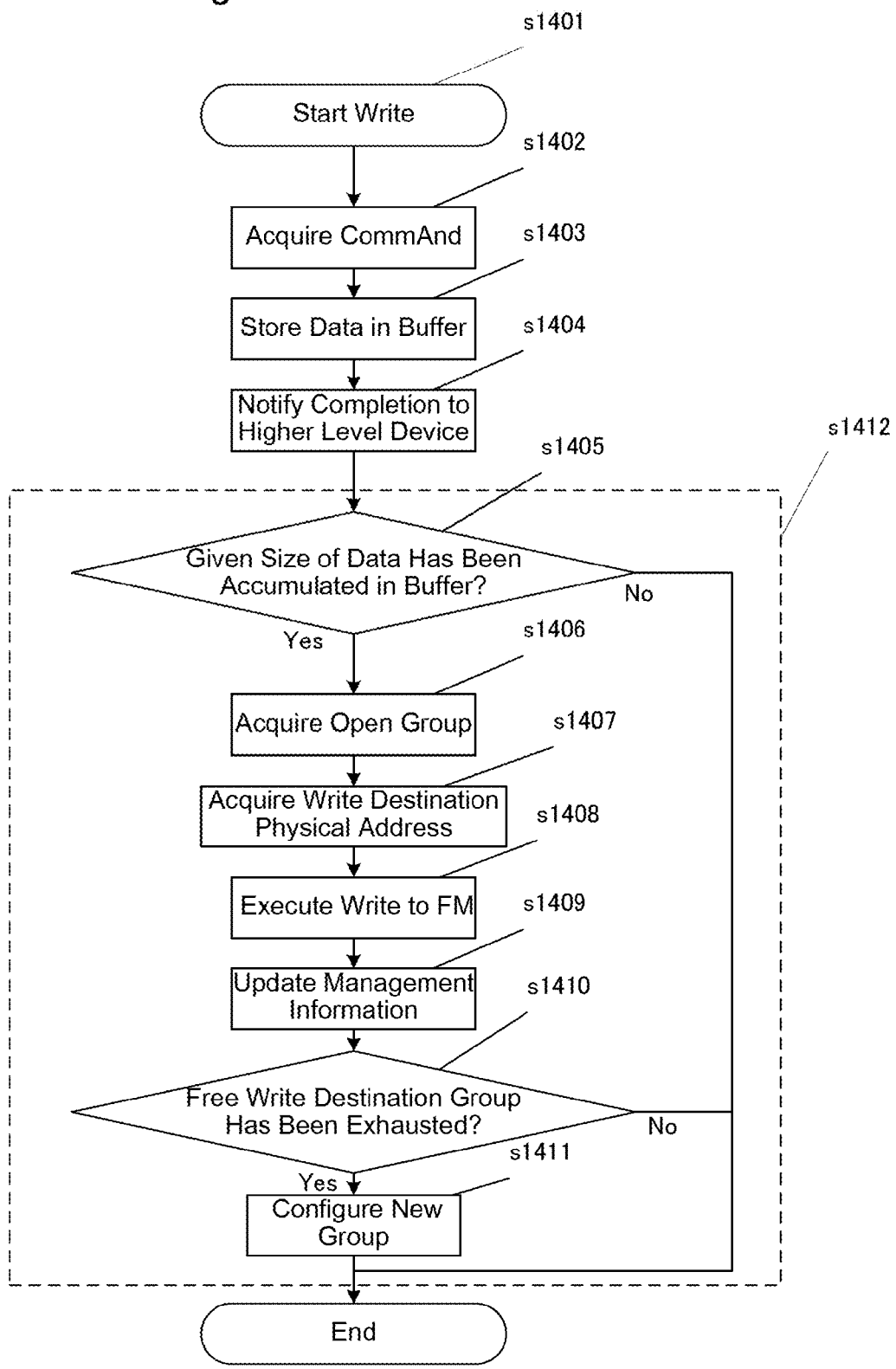
FIG. 14 illustrates a flow of write processing according to the FMPKG of Embodiment 1 of the present invention.

With reference to FIG. 14, the flow of a write processing S1401 executed when the FMPKG 112 receives a write request from a higher level device 102 will be described. This processing is realized by the CPU 206 executing the flash storage control program 302 and the logical-physical conversion program 306 in the main memory 207. In the following description, an example is illustrated where a data write request having a beginning address and an end address of a write target data corresponding to the page boundaries of the logical pages has been received from the higher level device 102.

A write command processing S1401 is a processing performed in response to a write request from a higher level device. At first, the CPU 206 acquires a write command in S1402. The write command acquired in S1402 includes a storage position of write data (write address: normally designating an LBA) and a write data length (number of sectors).

In S1403, the CPU 206 stores write data to the buffer 204. At that time, a logical page number of a logical page in which write data is stored is computed based on the write address and the write data length (if the write data length is a length corresponding to multiple pages, multiple logical page numbers will be derived through conversion), the write data is stored together with the logical page number derived via the conversion processing to the buffer. As described, by associating the write data with the logical page number and storing the same, when a read/write request arrives from a higher level device before the write data in the buffer is written to the FM, the data stored in the buffer 204 is read or written to process the request from the higher level device. After storing the write data to the buffer 204, the CPU 206 sends a completion notice to the higher level device (S1404). The completion notice to the higher level device can also be done prior to storing data to the FM.

Next, in S1405, the CPU 206 confirms whether a fixed amount of data or more exists in the buffer 204 or not, and if such data exists, executes a process to write the data in the buffer 204 to the physical page of the FM. The FMPKG 112 of the present invention allows a logical page to be stored across multiple physical pages, but on the other hand, the minimum unit of writing an FM is a physical page. Therefore, when data is to be written to the FM in logical page units or physical page units, all or a part of the logical page is written only to a portion of the physical page, so there may occur a case where the other areas of the physical page become invalid areas. In the write processing according to the embodiment of the present invention, a certain amount of data or more is collectively written into the FM, so as to minimize the amount of invalid area being created. Preferably, data should be written into the FM at the point of time when data having a size equal to a common multiple of the physical page size and the logical page size is accumulated in the buffer (for example, when the logical page size is 8 KB and the physical page size [as mentioned earlier, a "physical page size" refers to the size of the area to which data arriving from a higher level device is written, excluding ECC and other additional information] is 7 KB, data should be written to the FM at the point of time when data of a quantity equal to a least common multiple of 8 and 7, which is 56 KB, or multiples of 56 KB, is accumulated in the buffer, according to which no invalid area occurs, and the storage area can be utilized efficiently by the write processing.)

In S1406, the CPU 206 acquires a group number of the open group. An open group refers to a group where write is enabled, as mentioned earlier. Next, in S1407, the CPU 206 computes a physical block number 1204 and a page number within the physical block of a write destination physical block based on the subsequent write position 1202 and the amount of data to be currently written to the FM within the acquired open group. The physical block number 1204 and the page number within the physical block can be computed by dividing the subsequent write position 1202 by the "number of physical pages within a single physical block multiplied by the physical page size (the unit of the physical page size being the number of sectors)", based on which the virtual block number of the initial physical block being the data write target can be computed, and by referring to the virtual address configuration information 1007, the physical block number 1204 corresponding to the computed virtual block number can be specified. By computing the remainder of dividing the subsequent write position 1202 by the "number of physical pages within a single physical block multiplied by the physical page size", the initial page number (initial physical page number) of the pages within the physical block set as the current write destination can be acquired. If the data quantity to be written to the FM currently is stored across multiple physical pages, the numbers of pages corresponding to the number of necessary physical pages are acquired in serial numbers (if it is necessary to acquire five pages worth of physical pages, and if the initial physical page number within the page of the current write destination physical block is 3, page numbers 3, 4, 5, 6 and 7 are acquired).

In S1408, the CPU 206 sequentially writes the data in the buffer to the physical pages specified by the physical address (physical block number 1204 of the write destination physical block and the page number within the physical block) acquired in S1407. At this time, data corresponding to multiple logical pages within the buffer is written to the physical page serially (such as in FIG. 9) so that no invalid area occurs. Further, regarding the respective data stored in the physical page, the address in the virtual address space (the group number and the offset address within the group) corresponding to the physical page position in which the data is stored is computed (which can be computed based on the physical block number, the physical page number, and the offset position within the physical page of the physical page in which data is stored, and the virtual address configuration information 1007), which is mapped to the logical page number of each data (stored in the buffer) and temporarily stored. This information is necessary for updating the management information in S1409. Thereafter in S1409, the CPU 206 updates the management information, such as the page mapping table 1002. At that time, the information temporarily stored in S1408 (the information on the address in the virtual address space to which each data is stored, and the logical page number of the relevant data) is used to update the group #1102 and the offset address 1103 corresponding to the logical page (1101) being the write target to the current physical page. Further, the CPU updates the subsequent write position 1202 of the virtual address configuration information 1007 (adds the currently written data quantity (the number of sectors) to the subsequent write position 1202).

In S1408, the writing of data to the physical pages within the flash chip assumes that it is performed asynchronously to the write request from a higher level device, and that a certain amount of data is collectively written into the physical page. Efficient writing can be performed and management can be facilitated when assuming that the physical page is the write unit and that the logical page extends across multiple physical pages. Further, if the buffer is sufficiently large and a data corresponding to multiple physical blocks can be stored, it is possible to adopt a method to perform control so as to store data in the buffer until data corresponding to multiple physical blocks is accumulated, and to write data in parallel to multiple physical blocks to enhance the access performance further. In that case, it is preferable to select multiple physical blocks to be registered in the group 1201 from different FM chips 209 in the virtual address configuration information 1007. For example, in the group construction processing (described later), the virtual address configuration information 1007 is set so that the physical blocks mapped to virtual blocks whose virtual block #1203 are address 0, address 1, address 2 and address 3 are set to physical blocks within FM chips 209*a*, 209*b*, 209*e* and 209*f* of FIG. 2, and when data for four physical blocks is collectively stored to the FM chip, it is preferable to issue a write request in parallel to FM chips 209*a*, 209*b*, 209*e* and 209*f*, according to which the performance can be improved compared to a case where the write request is issued to a single FM chip 209.

On the other hand, as mentioned earlier, it is not necessary to adopt a method to store multiple pages collectively in the FM, and it is possible to adopt a method of storing data in single-physical-page units to the FM. In that case, if the logical page is stored across multiple physical pages in the FM, a portion of the area of a logical page may not be stored in the physical page and remains in the buffer, but the information of the logical page number and the offset address within the logical page of the logical page remaining in the buffer is managed together with the data remaining in the buffer, and when a writing process (process of FIG. 14) of another logical page is performed, a portion of the data in the logical page remaining in the buffer should be written to the physical page (although the data should be written so that the former half of the logical page stored in advance in the FM and the latter half of the logical page currently written are continuous in the virtual address space).

The method described above is a so-called write-back method. Therefore, when a failure such as such as power shutdown occurs, a power supply system for emergencies using capacitors and batteries is required to enable the write data stored in the volatile memories (such as buffers to be saved).

Finally in S1410, as a result of the current writing process, the CPU 206 determines whether a free space of the open group has been exhausted (the subsequent write position 1202 has exceeded the number of physical pages within a single group) or not, and if exhausted, the value of the subsequent write position 1202 of the virtual address configuration information 1007 is set to N/A for the group (open group) to which the current writing has been performed, so that the group to which the current writing has been performed is changed to a non-open group, and thereafter, a new group is constructed (S1411) and the process is ended. The process of S1411 will be described later.

In the above description, a case where the storage position of the write data corresponds to the page boundaries of the logical pages is described, but if a write request that does not correspond to the page boundaries of the logical pages, such as a write request of data having a size smaller than a single logical page size, is received from the higher level device 102, data corresponding to a single logical page (or multiple logical pages) including the write target data is read from the FM chip to the buffer between S1402 and S1403, and the write target data is overwritten to the data corresponding to one or multiple logical pages read to the buffer, and the overwritten data corresponding to one or multiple logical pages is written to the FM by executing the processes of S1404 and thereafter. That is, when a write request of data having a size that does not correspond to the logical page boundaries is received, read-modified-write of the whole logical page including the relevant data is performed, according to which the whole logical page is rewritten. That is, since information is managed in logical page units in the page mapping table 1002, it is necessary to rewrite the whole logical page even if the update relates to only a portion of the area within the logical page. However, this process is also similarly performed in a conventional flash storage, so that even if this process is performed, the performance will not be deteriorated (and is equivalent) compared to the conventional flash storage. Further, by setting the logical page size to the same size as the data size (such as 4 B and 8 KB)

designated by the I/O request issued by the program (OS, file system and application program) operating in the higher level device (such as the host computer 103), a write request that does not correspond to the page boundary of the logical pages will seldom arrive.

Figure 15:
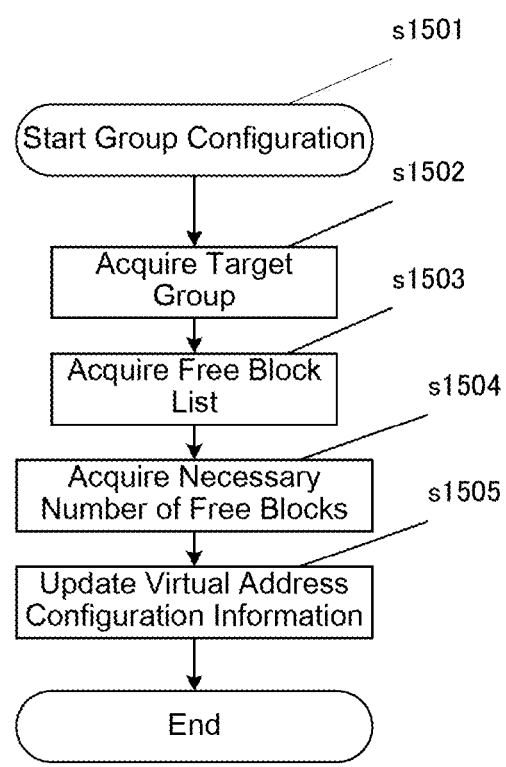
FIG. 15 illustrates a flow of a new group configuration processing according to the FMPKG of Embodiment 1 of the present invention.

Next, with reference to FIG. 15, we will describe the flow of a new group configuration processing S1501 performed in S1411 of FIG. 14.

The new group configuration processing S1501 will be executed when there is no more free page in the open group, and when the next write destination group becomes necessary. Therefore, the meaning of the present processing is the same as the processing for setting a group to an open group. At first, the CPU 206 acquires an unused group number to which physical blocks are not registered from the virtual address configuration information 1007 (S1502). Thereafter, the CPU 206 acquires an erased free block list, and acquires, from the list, a number of physical block numbers which are necessary to constitute one group (S1503, S1504). Finally in S1505, the CPU 206 registers the acquired physical block numbers to the virtual address configuration information 1007, and enters value 0 in the subsequent write position 1202, according to which the currently created new group is set as an open group and the new group configuration processing is ended.

A free block list is a list in which physical block numbers of erased physical blocks are registered. A minimum of one free block list should be prepared in the FMPKG 112, but it is also possible to provide multiple free block lists so as to enable appropriate physical blocks to be selected according to purpose, and to have physical block numbers of free physical blocks having the same type of attribute and characteristics in the respective free block lists.

For example, the life of a physical block is shortened (deteriorated) due to causes such as the number of erases performed thereto. Therefore, an index value showing a deterioration level based on the number of erases and other information is calculated and managed in each physical block (hereafter, the index value calculated based on information related to the number of erases and the like is called "deterioration level"), and multiple free block lists having free blocks with a given range of deterioration level may be provided (for example, if the physical block has an index value defined by a value (decimal value) in which the deterioration level is from zero to one, and the deterioration level is smaller (life is longer) if the value is smaller, two free block lists are provided, one being a free block list managing a free physical block with a deterioration level of 0 to 0.5 (having a long life) and a free block list managing a free physical block with a value exceeding a deterioration level of 0.5 (having a short life)). When executing the new group configuration processing, one of the free block lists is selected, and multiple free physical blocks can be selected from the selected single free block list (thereby, the selected physical block becomes a physical block with a deterioration level falling within a given range) to register them in a newly constructed group. The method of selecting a list out of multiple free block lists can be any arbitrary method, such as a method of designating a range of deterioration level in advance by a higher level device and having the FMPKG 112 select a free block list managing physical blocks within the range of the deterioration level designated by the higher level device, or a method of having the FMPKG 112 automatically select the list based on I/O status or operation time and the like.

Further, as mentioned earlier, it is possible to provide free block lists respectively corresponding to each physically different unit, such as the FM chip 209 or the die 401 (that is, the free physical blocks within the same FM chip 209 or the same die 401 are managed via each free block list), in order to enable parallel writing when data is written to the FMs, and to sequentially acquire one free physical block at a time from each free block list during configuration of a new group, and to register the same to the group. Thereby, physical blocks from multiple FM chips 209 or multiple dies 401 can be registered in a single group, and parallel writing of data can be realized when writing data to the FMs.

Next, we will describe the flow of a reclamation (RC)/refresh (RF) processing S1601 in group units executed by the FMPKG 112 according to Embodiment 1 of the present invention will be described with reference to FIG. 16.

Though the objects of RC and RF differ, both of them are the processes for copying valid data within a block to another block and for erasing the copy source block. According to the FMPKG 112 of Embodiment 1 of the present invention, RC/RF processing is executed in group units. This is because if only even one block within a group is erased, it is also necessary to copy the logical page stored across blocks adjacent to the erase target block. However, it is possible to perform RC/RF for each block.

At first, the CPU 206 acquires a target group in S1602. Regarding the target of RC/RF, for example, in case of RC, to reduce the amount of copying performed as much as possible, the group having the least valid data (group having the greatest number of invalid pages 1205) is preferentially selected by referring to the number of invalid pages 1205 managed by the virtual address configuration information 1007. Regarding RF, for example, a page having the longest elapsed time from when data has been written thereto is preferentially selected by referring to the last written time 1206. Further, it is possible to manage information related to reliability of the respective groups, and to select a group having a problem in reliability. Basically, open group is not selected in this step.

In S1603, a write destination group is selected. Open group is selected as the write destination. However, it is also possible to select an appropriate group corresponding to I/O frequency, or to newly configure a group, considering wear levelling or the like. In S1604, the CPU 206 determines whether valid data exists within the RC/RF target group (group selected in S1602), and when such data exists, copies a portion of the valid data to the buffer 204 in S1605. Regarding the data copied to the buffer 204, the CPU 206 writes the data to the FM by performing a process similar to S1412 during the write processing described with reference to FIG. 14 (processes from S1405 to S1411). However, when the process of S1412 is performed, the group selected in S1603 is acquired as open group in S1406.

The CPU 206 executes the processes of S1604, S1605 and S1412 until there is no more valid data in the RC/RF target group. When all valid data within the RC/RF target group is copied and there is no more valid data in the RC/RF target group, the CPU 206 performs an erase processing of all physical blocks registered in the RC/RF target group, and erases the information related to the group from the virtual address configuration information 1007 (S1610, S1611). The erased block is added to the free block list.

The above describes the FMPKG 112 according to Embodiment 1 of the present invention. The characteristic feature of the FMPKG 112 according to Embodiment 1 of the present invention is that the amount of management information is not increased excessively even if the logical page size does not match the physical page size. If the logical page size and the physical page size are not equivalent, as described in FIG. 9, there occurs a case where a single logical page is stored to extend over multiple physical pages. In that case, it is necessary to manage two information for a single logical page, which are the information of the physical page storing the former half of the logical page and the information of the physical page storing the latter half of the logical page. Therefore, for example, if almost all logical pages are stored to extend over two physical pages, the amount of information for managing the mapping between the logical page and the physical page will be double compared to the case where a single logical page fits within a single physical page.

On the other hand, in the case of an FMPKG 112 according to Embodiment 1 of the present invention, instead of managing the mapping between the logical page and the physical page, the logical page is mapped to a one-dimensional address space called a virtual address space, and the mapping between the logical page and the virtual address space is managed using the page mapping table. Since only one entry is stored as information representing the position of the single logical page in the page mapping table, the size of the page mapping table only requires a size equivalent to a logical-physical conversion table according to the prior art flash storage (where the size of the logical page is equal to the size of the physical page), so that even when almost all logical pages are stored across two physical pages, the size of the management information will not be increased.

Of course, as described in Embodiment 1, according to the FMPKG 112 of Embodiment 1 of the present invention, it is necessary to manage the virtual address configuration information which manages the mapping between the virtual address space and the physical blocks in addition to the page mapping table, but the size of the virtual address configuration information is extremely small compared to the logical-physical conversion table. Since information per page is stored in the logical-physical conversion table, the size of the logical-physical conversion table is proportional to the number of pages. On the other hand, since information per physical block is stored in the virtual address configuration information, the size is proportional to the number of physical blocks. Since a physical block contains 128 or 256 pages, for example (and more pages will be stored in the future), the number of physical blocks in the FMPKG 112 is only ¹⁄₁₂₈ or ¹⁄₂₅₆ of the number of physical pages. Therefore, the size of the virtual address configuration information will be extremely small, equal to or smaller than ¹⁄₁₀₀ of the logical-physical conversion table, so that the need to retain the virtual address configuration information will not cause much increase of management information.

<Embodiment 2>

Next, Embodiment 2 will be described. In the following description, the differences of Embodiment 2 from Embodiment 1 will mainly be described. Therefore, the configurations and processes that are the same as Embodiment 1 may be omitted from the description.

The basic configurations of the storage system and the FMPKG according to Embodiment 2 are almost the same as those of the storage system 101 and the FMPKG 112 of Embodiment 1, so that they are omitted from the drawing. However, the FMPKG of Embodiment 2 differs from the FMPKG 112 of Embodiment 1 in that it is equipped with a function to compress the write data from the higher level device and/or a function for encryption. These functions can be executed by the CPU 206 or the ASIC 203 of FIG. 2, or can be performed by a dedicated hardware provided for compression or for encryption. Further according to FMPKG of Embodiment 2, the write data is converted (compressed or encrypted, for example) and stored in that manner, but when the stored data is read out, the data is inverse-converted (compressed data is decompressed or encrypted data is decrypted) and handed over to the higher level device, so that the FMPKG is recognized as the same device as the FMPKG 112 of Embodiment 1 from the perspective of the storage system or the host computer. Therefore, the configuration of the storage system according to Embodiment 2 is the same as that of Embodiment 1.

In Embodiment 1, there is no limitation other than that the logical page is stored to cross over multiple physical pages, but the present embodiment especially describes a processing system of a case where the data size varies during storage of the logical page. This variation is caused by the data being subjected to data conversion such as data compression or encryption. In this case, the storage status of data in the flash devices of the respective logical pages will become more complex.

FIG. 17 illustrates a content of a page mapping table 1700 according to Embodiment 2.

Similar to Embodiment 1, according to the FMPKG of Embodiment 2, a one-dimensional logical storage space (corresponding to 600 of FIG. 6) is provided to a higher level device, wherein this one-dimensional logical space is divided into given sizes (such as 16 sectors) from the beginning, and the divided areas are each managed as logical pages. The difference from Embodiment 1 is that data conversion such as compression or decryption is performed, but this data conversion is performed per logical page. In other words, data having a size smaller than a single logical page will not be converted (compressed, for example) or data stored across multiple logical pages will not be converted (compressed).

The page mapping table 1700 differs from the page mapping table 1002 of Embodiment 1 in that each entry within the page mapping table 1700 has added thereto an entry of length 1705 representing data length. The size of each logical page varies through data conversion, so that the data size of the logical page after conversion is managed by this entry. The unit of the value stored in the entry of length 1705 can be a sector (512 bytes or 520 bytes), but other units (such as bytes) can be used. That is, in the page mapping table 1700, the information of the range in the virtual address space to which data of a logical page is associated after conversion (such as compression) is managed per logical page.

Similar to Embodiment 1, the FMPKG according to Embodiment 2 manages the virtual address configuration information, but the content thereof is the same as the virtual address configuration information 1007 according to Embodiment 1, so that the description thereof is omitted.

Figure 18:
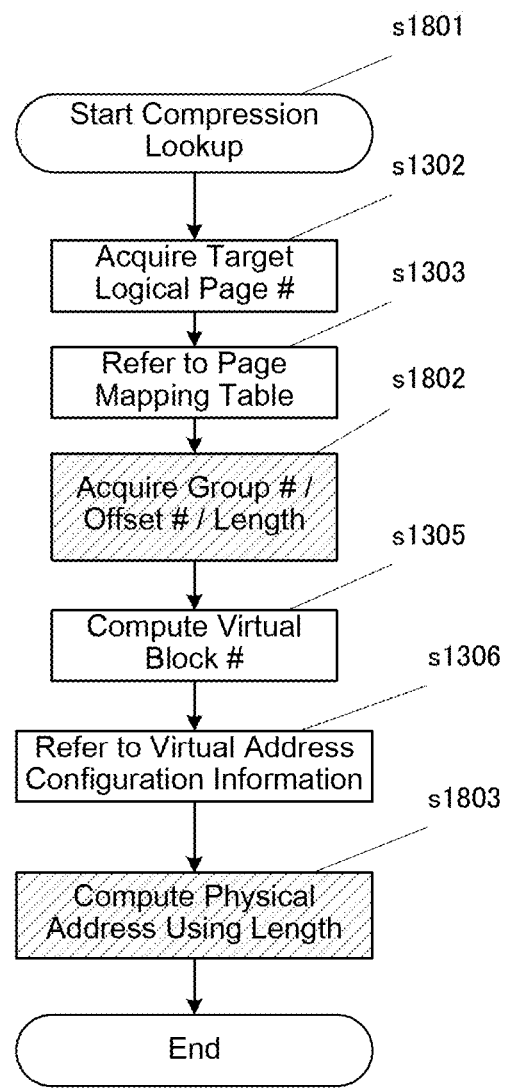
FIG. 18 illustrates a flow of lookup processing according to the FMPKG of Embodiment 2 of the present invention.

FIG. 18 illustrates a flow of conversion processing (lookup processing) from the logical address to the physical address executed by the FMPKG according to Embodiment 2. Similar to the lookup processing of Embodiment 1, in the conversion processing of the logical address to the physical page number performed when a read request is received from the higher level device, a process for computing a physical position of the area corresponding to a single logical page is described according to a case where the initial position of access target data designated by the read request corresponds to the logical page boundary and the size of the access target data is equivalent to the logical page size.

Figure 13:
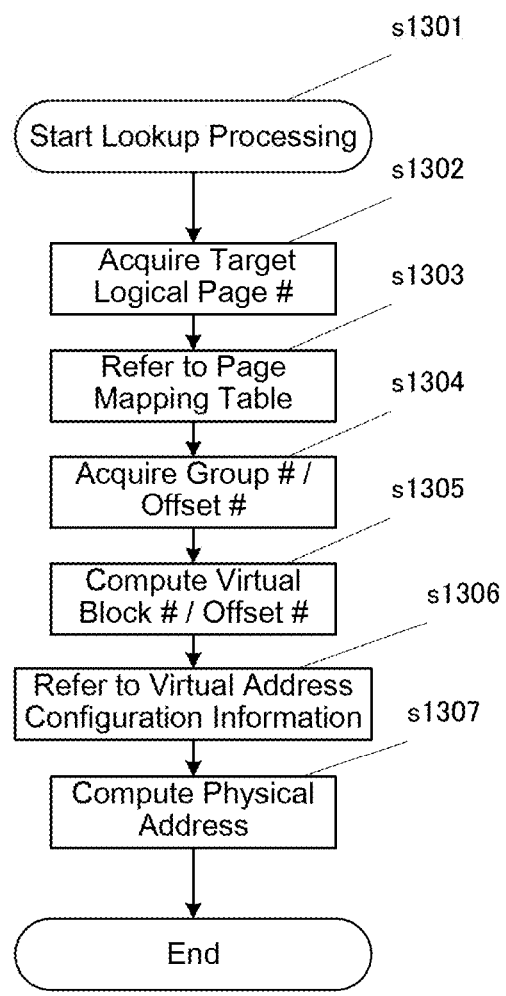
FIG. 13 illustrates a flow of lookup processing according to the FMPKG of Embodiment 1 of the present invention.

The differences between the present Embodiment and the lookup flow (FIG. 13) of Embodiment 1 are that the process of S1304 in FIG. 13 (process for acquiring group number and offset address within group) is replaced with S1802, and the process of S1307 of FIG. 13 is replaced with S1803. In S1802, the CPU of FMPKG acquires a group number 1703 of the corresponding logical page, an offset address 1704 within the group, and a length 1705 from the page mapping table 1700. The initial address in the virtual address space storing the relevant logical page can be acquired based on the group number and the offset address, so that the processes of S1305 and S1306 can be performed similarly in Embodiment 2 as in Embodiment 1.

Then, in S1803, the CPU computes a beginning physical page number and a final physical page number of the access target data. The process for computing the beginning physical page number is the same as Embodiment 1, but in the process for computing the last physical page number of the access target data, Embodiment 2 differs from Embodiment 1 in that the information of length 1705 is used instead of the size of a single logical page to compute the final physical page number. The other processes are similar to the processes described with reference to Embodiment 1.

Figure 19:
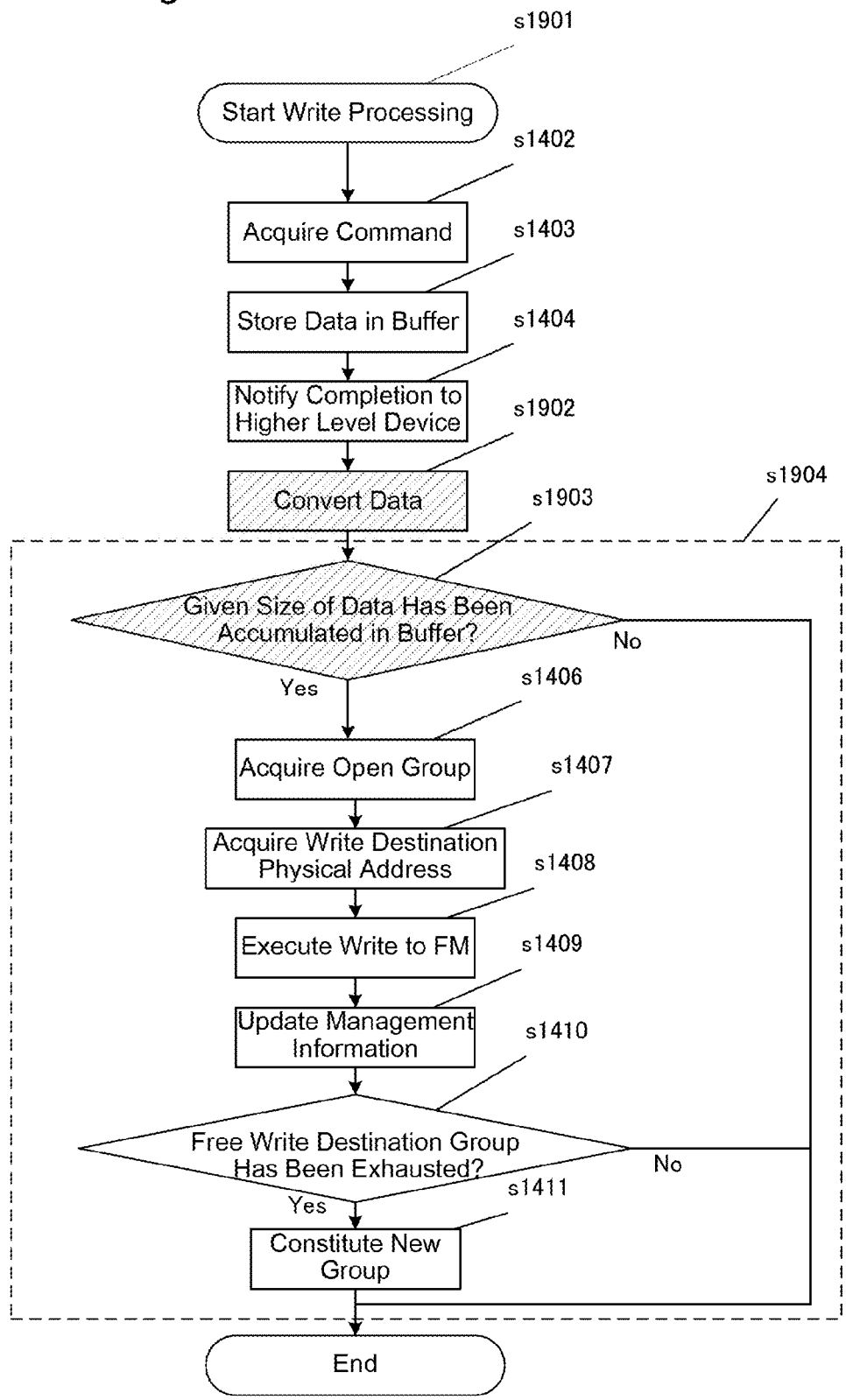
FIG. 19 illustrates a flow of write processing according to the FMPKG of Embodiment 2 of the present invention.

FIG. 19 illustrates the flow of the processing executed when the FMPKG according to Embodiment 2 receives a write request from a higher level device. Similar to the description of FIG. 14, we will mainly describe a case where the storage position of write data corresponds to the page boundaries of the logical pages.

The difference from the write processing of Embodiment 1 (process of FIG. 14) is that conversion processing is performed (S1902) to data received from the higher level device stored in the buffer by the processes of S1402 through S1404 (thereby, the data prior to conversion stored in the buffer is replaced with the converted data). The conversion processing can be performed by the CPU of the FMPKG as mentioned earlier, or the CPU can let a dedicated hardware perform the processing. The present processing differs from the processing illustrated in FIG. 14 of Embodiment 1 in that according to S1903 performed after S1902, the CPU checks the quantity of data in the buffer based on the converted size, and if it is determined that the quantity of data in the buffer (size of the data after conversion) is equal to or greater than a given size, it starts a write processing to the flash device, and that during update of management information (S1409), the present process performs update of information in the length 1705. The other processes are similar to Embodiment 1.

As a modified example of Embodiment 2, a method can be adopted where the FMPKG will not perform data conversion when storing the write data received from the higher level device to the FM (will not perform the process of S1902 when executing the process of FIG. 19), and performs data conversion such as compression when performing the RC/RF processing. The flow of the RC/RF processing according to such example will be illustrated in FIG. 20.

Figure 16:
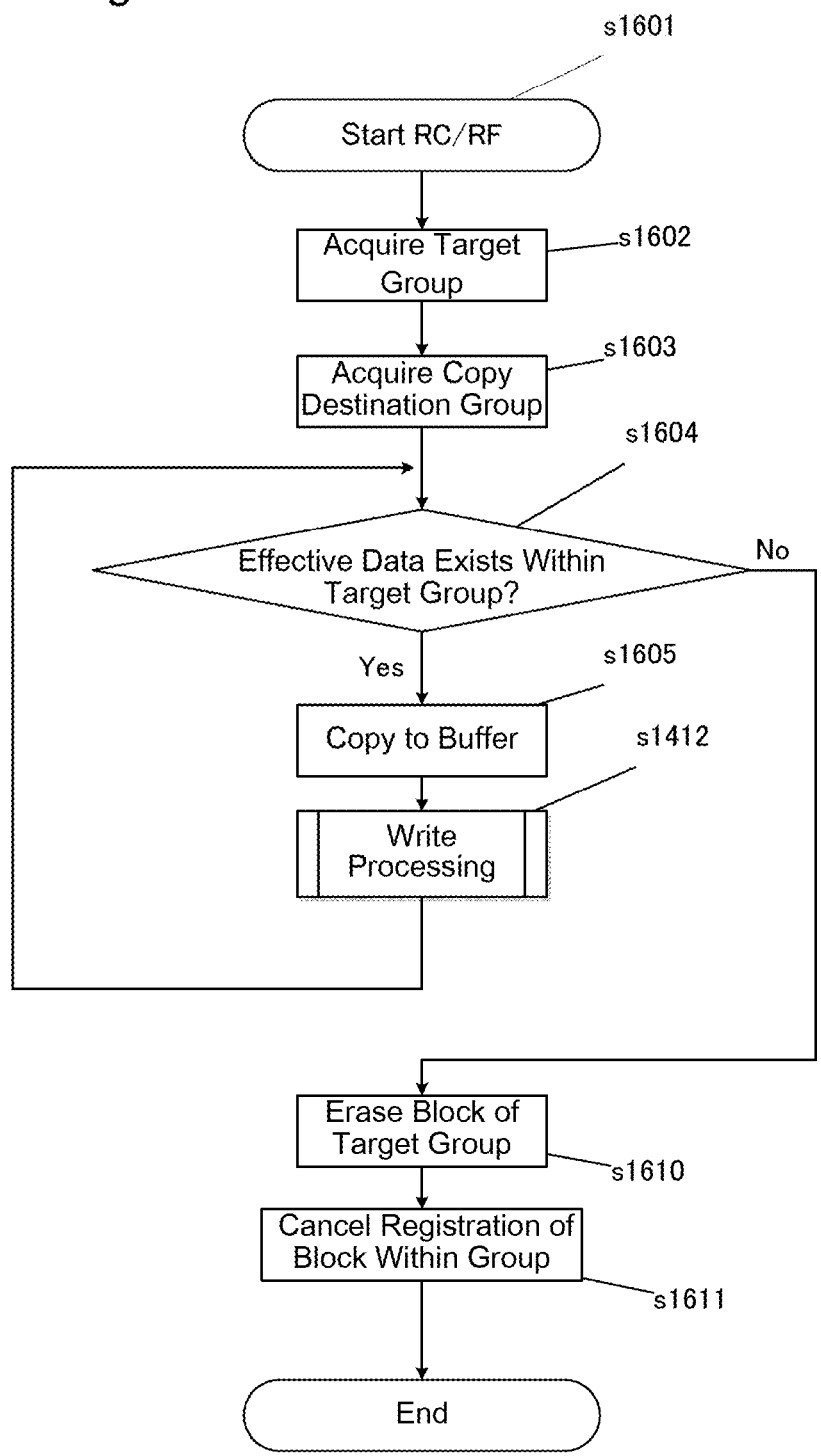
FIG. 16 illustrates a flow of RC/RF processing according to the FMPKG of Embodiment 1 of the present invention.
Figure 20:
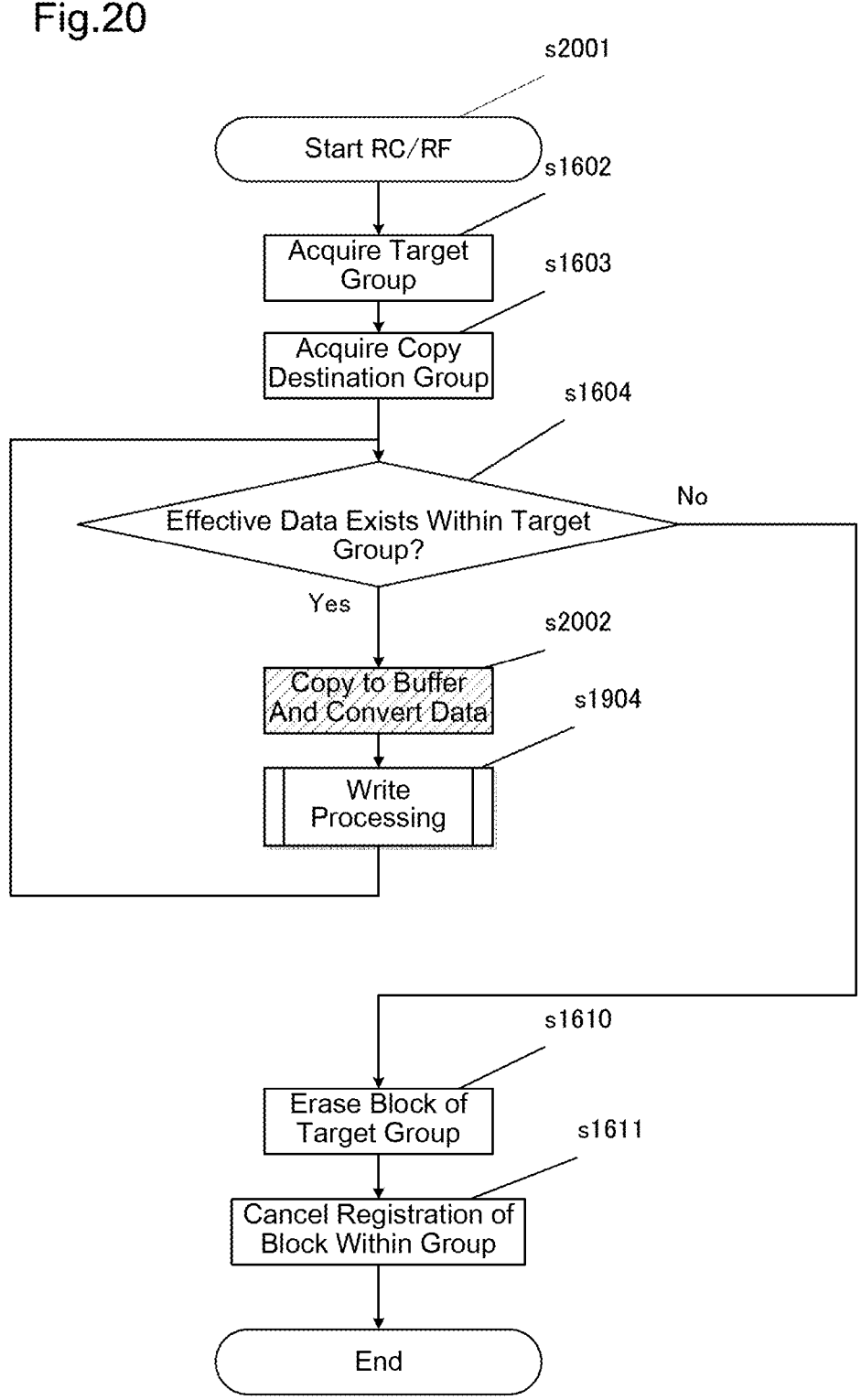
FIG. 20 illustrates a flow of RC/RF processing according to the FMPKG of Embodiment 2 of the present invention.

The processing of FIG. 20 differs from the processing of FIG. 16 of Embodiment 1 in that when copying the data to the buffer (S1605 in FIG. 16 of Embodiment 1), the CPU (or a dedicated hardware) executes data conversion and the converted data is stored in the buffer according to the process of FIG. 20 (S2002). The other steps are the same as the RC/RF processing of Embodiment 1.

The FMPKG according to Embodiment 2 has been described above. The management information being managed by the FMPKG according to Embodiment 2 are the page mapping table 1700 and the virtual address configuration information, similar to Embodiment 1. Compared to Embodiment 1, the page mapping table 1700 is additionally required to store information on data length, but similar to Embodiment 1, only a single-entry worth of information representing the position of a single logical page is needed to store in the page mapping table, so that the amount of management information is not increased so much.

Further according to FMPKG of Embodiment 1, since all logical page sizes are the same, it is possible to adopt a method of setting the logical page size to be equal to the physical page size as a method for reducing the management information size. On the other hand, in order to perform data conversion such as data compression or encryption of storage data as according to FMPKG of Embodiment 2, the data size is varied depending on the data content. Therefore, it is not possible to adopt a method of setting all the logical page sizes to be equal to the physical page size, so that in order to enhance the data storage efficiency, a configuration must be adopted to allow a single logical page to be stored across multiple physical pages. By adopting the method of Embodiment 2, even when the size of the stored data is varied due to data conversion, the relationship between the logical page and the physical storage position can be managed through a small amount of management information.

<Embodiment 3>

Next, we will describe Embodiment 3. In the following description, mainly the differences with Embodiment 1 will be described, and the configurations and processes that are the same as Embodiment 1 may be omitted or simplified.

In Embodiments 1 and 2, the respective physical page sizes are fixed, but the present embodiment will describe a case where the physical page size is not fixed. However, the size is not determined completely freely, but a certain number of physical page patterns exist within a single FMPKG. For example, a method can be adopted where the most suitable ECC size is applied for each physical page.

Figure 21:
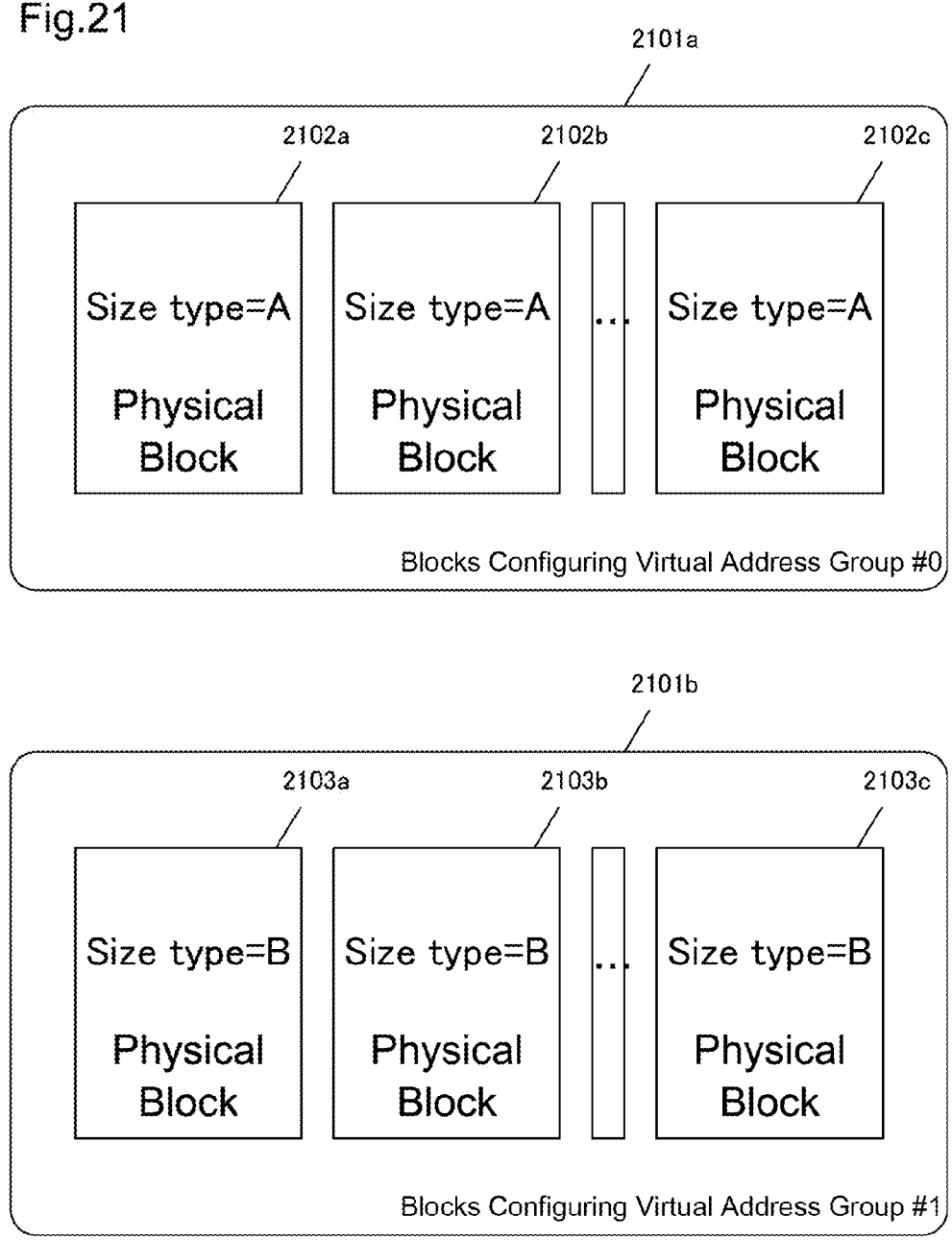
FIG. 21 illustrates an example of configuring a virtual address group using a device in which blocks having different physical page sizes exist.

FIG. 21 is a view illustrating an example of composing a virtual address group (and virtual address space) using a device having blocks with different physical page sizes.

There are two or more types of physical blocks having different physical page size characteristics within a device, and the various types of physical blocks are used to constitute a virtual address group (group). In the present specification, "physical page size characteristics" refers to a tendency or distribution of page sizes of physical pages within a physical block, such as a state where the sizes of all the physical pages within a single physical block are the same, or a state where physical pages having different physical page sizes exist within the same physical block and are distributed in a specific pattern (such as when the physical page size of physical pages numbered 0 through n is 7 KB and the physical page size of physical pages numbered (n+1) through (n+m) is 8 KB in the respective physical blocks).

In the example of FIG. 21, the type of a physical block having a certain physical page size characteristics is called type A, and the type of a physical block having a different physical page size characteristics as type A is called type B. The FMPKG of Embodiment 3 is composed of a virtual address group 2101*a* in which only physical blocks of type A (2102) are registered, and a virtual address group 2101*b* in which only physical blocks of type B (2103) are registered. Of course, other types of virtual address groups can also be included.

The advantages of composing a group using the same type of blocks are that the characteristics of blocks are the same within the group so that the management of life of the blocks can be facilitated, and that specification of the physical blocks and physical pages mapped to the virtual address space of the group based on the offset address within the group can be executed without having to refer to the information of individual blocks.

FIG. 22 illustrates a virtual address configuration information 2201 according to the present embodiment.

The components constituting the virtual address configuration information 2201 of Embodiment 3 are the same as those of Embodiment 1 from group 2202 through last written time 2207. However, the virtual address configuration information 2201 differs from the virtual address configuration information 1007 of Embodiment 1 in that the information related to block type 2208 mapped to the group is retained for each group. The FMPKG identifies the physical page size of each physical page within the group based on the information stored in the type 2208.

FIG. 23 illustrates a flow of the process for converting a logical address to a physical address (lookup processing) executed by the FMPKG according to Embodiment 3 of the present invention.

Similar to the lookup processing (FIG. 13) described in Embodiment 1, the CPU (of the FMPKG) acquires an access target logical page number, refers to the page mapping table based on the acquired logical page number, and acquires the group number and the offset address within the group mapped to the access target logical page number (S1302 through S1304). Thereafter, the CPU refers to the virtual address configuration information 2201, and acquires a type 2206 (S2302). Based on the type 2206, the CPU identifies the physical page configuration (the size of each physical page) within the respective physical blocks constituting the virtual address group, and in subsequent S2303, the virtual block number and the offset address within the virtual block are computed based on the offset address within the group and the physical page configuration. Finally, the CPU acquires the physical address in S2304. S2304 is a process corresponding to S1306 and S1307 of Embodiment 1 (FIG. 13). In the lookup processing of Embodiment 1, the physical address could be computed by simply dividing the offset address within the virtual block by the physical page size, but the process of Embodiment 3 differs from Embodiment 1 in that depending on the physical page configuration (such as when physical pages of different sizes exist within a single physical block), the physical address cannot be computed via a simple dividing process (however, the physical address can be computed if the distribution pattern of page sizes of the respective physical pages within the physical block is recognized).

FIG. 24 illustrates a flow of a new group configuration processing according to Embodiment 3. The difference from Embodiment 1 is that the FMPKG according to Embodiment 3 of the present invention manages a free block list for each type, and the CPU determines the type of the acquisition target block when acquiring a block and acquires the free block list of the determined type (S2402, S2403). For example, flash memory control device 201 constantly monitors the I/O frequency, and during the new group configuration processing, the device performs selection, such as when the I/O frequency is high, constituting a group from a physical block corresponding to type A being a type of a physical block having a relatively high reliability, but when the I/O frequency is low, constituting a group from a physical block corresponding to type B being a type of a physical block not having such a high reliability. Thus, the blocks constituting a new group can be composed of the same type of blocks. In order to perform this process efficiently, it is possible to have the respective blocks managed via queues corresponding to the respective types, for example. Further, if there is a difference in the reliability and data storage quantity between the different types, it is possible to adopt a method to select a most appropriate type based on the storage data type.

The above description explains the FMPKG according to Embodiment 3. For example, in a chip adopting a three-dimensional lamination technique (3D laminated chip), whose study is currently making advancement, pages having different characteristics exist within the same FMP chip, and it may become necessary to adopt ECCs having different sizes for the respective pages. Therefore, the configuration illustrated in Embodiment 3 is useful in the application of an FMPKG using an FM chip having a characteristic feature similar to a 3D laminated chip.

REFERENCE SIGNS LIST

101: Storage system
102: Storage controller
103: Host computer
104: Management terminal
105: SAN
106: Maintenance interface
107: Host interface
108: CPU
109: Memory
110: Drive interface
112: Flash memory storage device (FMPKG)
201: Flash memory control device
202: Storage interface
203: ASIC
204: Buffer
205: Battery
206: CPU
207: Main memory
208: Flash memory interface
209: Flash memory chip (FM chip)
401: Die
402: Page buffer
403: Physical block
404: Physical page
501: Code Word (CW)
502: Data
503: ECC
1001: Logical page
1002: Page mapping table
1003: Virtual address space
1004: Virtual address group
1006: Virtual block
1007: Virtual address configuration information
1008: Physical block
1009: Physical page

The invention claimed is:

1. A flash memory storage device comprising a controller and multiple flash memory chips, comprising:
the controller comprising
a processor,
a buffer composed of a volatile memory,
a storage interface for connecting with a higher level device, and
a flash memory interface for connecting the multiple flash memories with the controller;
each physical block in the multiple flash memory chips includes multiple physical pages which are minimum access unit areas of the flash memory chip,
the processor, managing a logical storage space being provided to the higher level device, dividing the logical storage space into logical pages units which are areas having a size not equal to a size of the physical page, the processor managing a virtual address space which is a linear address space to which multiple physical pages in the multiple flash memory chips and multiple logical pages in the logical storage space are respectively mapped; and the processor further managing a page mapping table storing a correspondence between the logical page and an address in the virtual address space, and a virtual address configuration information storing a correspondence between an area in the virtual address space and the physical pages.

2. The flash memory storage device according to claim 1, wherein:

when the processor receives a write request to the logical page from the higher level device, it selects an unused area in the virtual address space, and stores the correspondence between an address of the selected unused area in the virtual space and the logical page in the page mapping table.

3. The flash memory storage device according to claim 1, wherein:

when the processor receives a read request to the logical page from the higher level device, the processor refers to the page mapping table to specify the address in the virtual space corresponding to the logical page, and by referring to the virtual address configuration information, specifies one or multiple physical pages within a physical block mapped to the address in the virtual address space.

4. The flash memory storage device according to claim 1, wherein:

when the processor receives write data from the higher level device, the processor accumulates the write data in the buffer; and when data corresponding to a size of a single physical page or greater is accumulated in the buffer, the processor stores the data accumulated in the buffer to the physical page per size of the physical page.

5. A flash memory storage device comprising a controller and multiple flash memory chips, comprising:

the controller comprising
a processor,
a buffer composed of a volatile memory,
a storage interface for connecting with a higher level device, and
a flash memory interface for connecting the multiple flash memories with the controller;
each physical block in the multiple flash memory chips includes multiple physical pages which are minimum access unit areas of the flash memory chip,
the processor, managing a logical storage space being provided to the higher level device, dividing the logical storage space into logical pages units,
the processor managing a virtual address space which is a linear address space to which multiple physical pages in the multiple flash memory chips and multiple logical pages in the logical storage space are respectively mapped
the processor further managing a page mapping table storing a correspondence between the logical page and an address in the virtual address space, and a virtual address configuration information storing a correspondence between an area in the virtual address space and the physical pages,
the processor has multiple free block lists for managing a physical block not yet mapped to the virtual address space, and each free block list manages physical block numbers of physical blocks having a same type of attribute,
the attribute is a deterioration level which is an index value based on information related to a number of erases of a physical block, or is an attribute information for specifying a flash memory chip to which a physical block belongs.

6. The flash memory storage device according to claim 5, wherein:

a physical block number of a free physical block having a deterioration level within a first range is managed by a first free block list out of the multiple free block lists, and a physical block number of a free physical block having a deterioration level within a second range is managed by a second free block list out of the multiple free block lists; and when the processor maps the physical block to an area within a given range of the virtual address space, the processor selects one free block list out of the first and second free block lists, and maps a physical block managed by the selected free block list to an area within a given range of the virtual address space.

7. The flash memory storage device according to claim 5, wherein:

the attribute is an attribute information for specifying a flash memory chip to which a physical block belongs, and the physical blocks having an equivalent attribute information are managed by the same free block list;

when the processor maps the physical block to an area within a given range of the virtual address space, the processor selects one free physical block from each of the multiple free block lists, and maps the selected physical block to the area within the given range of the virtual address space; and when the processor stores data to multiple physical blocks mapped to the area within the given range of the virtual address space, the processor issues a write request in parallel to the multiple physical blocks.

8. A flash memory storage device comprising a controller and multiple flash memory chips, comprising:

the controller comprising
a processor,
a buffer composed of a volatile memory,
a storage interface for connecting with a higher level device, and
a flash memory interface for connecting the multiple flash memories with the controller;
each physical block in the multiple flash memory chips includes multiple physical pages which are minimum access unit areas of the flash memory chip,
the processor, managing a logical storage space being provided to the higher level device, dividing the logical storage space into logical pages units,
the processor managing a virtual address space which is a linear address space to which multiple physical pages in the multiple flash memory chips and multiple logical pages in the logical storage space are respectively mapped,
the processor further managing a page mapping table storing a correspondence between the logical page and an address in the virtual address space, and a virtual address configuration information storing a correspondence between an area in the virtual address space and the physical pages,
the controller is configured to convert and store the write data from the higher level device per logical page; and the controller manages information of a range within the virtual address space to which the converted data in logical page is mapped in the page mapping table per each logical page.

9. The flash memory storage device according to claim 8, wherein:

when the controller receives write data from the higher level device, the controller converts the write data and stores it in a buffer, and thereafter, writes the converted data stored in the buffer into the flash memory chip.

10. The flash memory storage device according to claim 8, wherein:

when the controller receives write data from the higher level device, the controller stores the write data to a buffer without converting it, writes the data stored in the buffer in the flash memory chip, and when the data written in the flash memory chip is to be copied to a different flash memory chip, the controller converts the data written in the flash memory chip, and copies the converted data to a different flash memory chip.

11. A flash memory storage device comprising a controller and multiple flash memory chips, comprising:

the controller comprising
a processor,
a buffer composed of a volatile memory,
a storage interface for connecting with a higher level device, and
a flash memory interface for connecting the multiple flash memories with the controller;
each physical block in the multiple flash memory chips includes multiple physical pages which are minimum access unit areas of the flash memory chip,
the flash memory storage device includes two or more types of physical blocks having different physical page size characteristics,
the processor, managing a logical storage space being provided to the higher level device, dividing the logical storage space into logical pages units,
the processor managing a virtual address space which is a linear address space to which multiple physical pages in the multiple flash memory chips and multiple logical pages in the logical storage space are respectively mapped;
the processor further managing a page mapping table storing a correspondence between the logical page and an address in the virtual address space, and a virtual address configuration information storing a correspondence between an area in the virtual address space and the physical pages;
the processor manages multiple types of said virtual address spaces; and
only the blocks having the same physical page size characteristic are mapped to each respective virtual address space.

12. A storage system comprising a storage controller and multiple flash memory storage devices, wherein:

the flash memory storage device includes a controller and multiple flash memory chips; each physical block in the multiple flash memory chips includes multiple physical pages which are minimum access unit areas of the flash memory chip;
the controller manages a logical storage space being provided to the storage controller, dividing the logical storage space into logical pages units which are areas having a size not equal to a size of the physical page, and manages a virtual address space which is a linear address space to which multiple physical pages in the multiple flash memory chips and multiple logical pages in the logical storage space are respectively mapped; and
the controller further manages a page mapping table which manages a correspondence between the logical page and an address in the virtual address space, and a virtual address configuration information which manages a correspondence between an area in the virtual address space and the physical pages.

13. The storage system according to claim 12, wherein:

when the controller receives a write request to the logical page from the storage controller, the controller selects an unused area in the virtual address space, and stores the correspondence between an address of the selected unused area in the virtual space and the logical page in the page mapping table.

14. The storage system according to claim 12, wherein:

when the controller receives a read request to the logical page from the storage controller, the controller refers to the page mapping table to specify the address in the virtual space corresponding to the logical page, and by referring to the virtual address configuration information, specifies one or multiple physical pages within a physical block mapped to the address in the virtual address space.

\* \* \* \* \*